United States Patent
Honma et al.

(10) Patent No.: US 10,609,719 B2
(45) Date of Patent: Mar. 31, 2020

(54) WIRELESS COMMUNICATION DEVICE, TRANSMISSION METHOD AND COMPUTER PROGRAM

(71) Applicant: KDDI CORPORATION, Tokyo (JP)

(72) Inventors: Hiroaki Honma, Tokyo (JP); Tomoki Sada, Tokyo (JP)

(73) Assignee: KDDI CORPORATION, Tokyo (JP)

(*) Notice: Subject to any disclaimer, the term of this patent is extended or adjusted under 35 U.S.C. 154(b) by 70 days.

(21) Appl. No.: 15/751,324

(22) PCT Filed: Aug. 3, 2016

(86) PCT No.: PCT/JP2016/072773
§ 371 (c)(1),
(2) Date: Feb. 8, 2018

(87) PCT Pub. No.: WO2017/029991
PCT Pub. Date: Feb. 23, 2017

(65) Prior Publication Data
US 2018/0242342 A1   Aug. 23, 2018

(30) Foreign Application Priority Data
Aug. 14, 2015  (JP) ................ 2015-160212

(51) Int. Cl.
*H04W 72/12* (2009.01)
*H04W 74/08* (2009.01)
(Continued)

(52) U.S. Cl.
CPC ..... *H04W 72/1221* (2013.01); *H04L 12/1868* (2013.01); *H04W 16/14* (2013.01);
(Continued)

(58) Field of Classification Search
None
See application file for complete search history.

(56) References Cited

U.S. PATENT DOCUMENTS

| 2004/0170150 A1 | 9/2004 | Guo et al. | |
| 2009/0221366 A1* | 9/2009 | Ward | G07F 17/32 463/30 |

(Continued)

FOREIGN PATENT DOCUMENTS

| EP | 1821497 A1 | 8/2007 |
| JP | 2014-165512 A | 9/2014 |

OTHER PUBLICATIONS

Search Report issued in European Patent Office (EPO) Patent Application No. 16836982.5, dated Feb. 11, 2019.

(Continued)

*Primary Examiner* — Jutai Kao
(74) *Attorney, Agent, or Firm* — Greenblum & Bernstein, P.L.C.

(57) ABSTRACT

A wireless communication device includes a transmission unit that transmits a signal to a plurality of destinations after waiting for a common waiting time set for transmission to the plurality of destinations, a counter that updates a counter value on the basis of acknowledgement information from each destination for the signal transmitted by the transmission unit, and an update determination unit that determines a settable range of the common waiting time which is to be set for transmission to a plurality of scheduled transmission destinations according to the counter value. The transmission unit determines the common waiting time for transmission to the plurality of scheduled transmission destinations on the basis of the settable range determined by the update determination unit.

5 Claims, 16 Drawing Sheets

(51) Int. Cl.
   *H04W 16/14*   (2009.01)
   *H04L 12/18*   (2006.01)
   *H04W 24/08*   (2009.01)
   *H04W 4/06*    (2009.01)
(52) U.S. Cl.
   CPC ............ *H04W 24/08* (2013.01); *H04W 74/08* (2013.01); *H04W 74/0825* (2013.01); *H04W 4/06* (2013.01)

(56) References Cited

U.S. PATENT DOCUMENTS

| | | | | |
|---|---|---|---|---|
| 2015/0223154 A1* | 8/2015 | Jeong | ............ | H04W 48/16 370/338 |
| 2017/0048861 A1* | 2/2017 | Choi | ............ | H04L 1/1887 |

OTHER PUBLICATIONS

Ericsson, "Findings Based on Coexistence Evaluation Results for LAA with DL and UL Transmissions", 3GPP TSG RAN WG1 #81, R1-153131, http://www.3gpp.org/ftp/tsg_ran/WG1_RL1/TSGR1_81/Docs/R1-153131.zip May 29, 2015.
Huawei, HiSilicon, "Description of candidate LBT schemes", 3GPP TSG RAN WG1 Ad-hoc_LTE_LAA_1503, R1-150978, http://www.3gpp.org/ftp/tsg_ran/WG1_RL1/ TSGR1_AH/LTE_LAA_1503/Docs/R1-150978.zip Mar. 26, 2015.
IEEE Standards Assoc., "Part 11: Wireless LAN Medium Access Control (MAC) and Physical Layer (PHY) Specifications; Amendment 4: Enhancements for Very High Throughput for Operation in Bands below 6 GHz," Std 802.11acTM-2013, 2013.
KDDI, "Category 4 LBT for LAA Downlink", 3GPP TSG RAN WG1 #82, R1-154375, http://www.3gpp.org/ftp/tsg_ran/WG1_RL1/TSGR1_82/Docs/R1-154375.zip Aug. 28, 2015.
Samsung, "Further discussion on LBT for LAA DL transmission", 3GPP TSG RAN WG1 #81, R1-152874, http://www.3gpp.org/ftp/tsg_ran/WG1_RL1/TSGR1_81/Docs/R1-152874.zip_2015.05.29.
"3rd Generation Partnership Project; Technical Specification Group Radio Access Network; Study on Licensed-Assisted Access to Unlicensed Spectrum; (Release 13)", 3GPP TR 36.889 V1.0.0, May 2015.
Alcatel-Lucent Shanghai Bell, Alcatel-Lucent, "LBT and Frame Structure Design for DL-Only LAA", 3GPP TSG RAN WG1 #81, R1-153385, http://www.3gpp.org/ftp/tsg_ran/WG1_RL1/TSGR1_81/Docs/R1-153385.zip, May 29, 2015.
International Search Report issued in International Bureau of WIPO Patent Application No. PCT/JP2016/072773, dated Oct. 25, 2016, along with an English translation thereof.

* cited by examiner

WIRELESS COMMUNICATION DEVICE, TRANSMISSION METHOD AND COMPUTER PROGRAM

TECHNICAL FIELD

The present invention relates to a wireless communication device, a transmission method and a computer program.

Priority is claimed on Japanese Patent Application No. 2015-160212, filed Aug. 14, 2015, the content of which is incorporated herein by reference.

BACKGROUND ART

A listen before talk (LBT) technology is known in the related art. In the LBT technology, when a plurality of communication carriers or wireless communication systems share a frequency band, a wireless communication device senses the usage status of the frequency band before performing transmission and determines whether or not it is possible to perform transmission on the basis of the carrier-sense result in order not to cause radio interference with other wireless communication devices that share the frequency band. In an LBT technology for a wireless LAN called Wi-Fi (registered trademark) as one of the LBT technologies, carrier-sense is performed during a fixed waiting time plus a randomly determined waiting time to stochastically avoid collisions (for example, see Non-Patent Literature 1). The randomly determined waiting time is called a backoff time (Backoff).

FIG. 15 is an explanatory diagram of a related-art Wi-Fi LBT technology. As shown in FIG. 15, before performing transmission, a wireless LAN device performs carrier-sense during a time which is the sum of a fixed waiting time (a distributed inter-frame space (DIFS)) and a randomly determined waiting time (a backoff time). The backoff time is determined according to a backoff value randomly selected from a range of 0 to a contention window (CW) with a uniform probability. When the wireless LAN device has not received an acknowledgement (ACK) signal within a certain time for data that the wireless LAN device has transmitted at transmission #N (i.e., when a reception failure has occurred), the CW is enlarged to increase a probability that the backoff time becomes greater (where Backoff=Random ([0, CWmin*$2^{(n-1)}$−1]); n=1, 2, . . . ) in order to lower a probability that packets collide at transmission #N+1. The CW is increased twofold each time. An initial value of the CW is 15 and a maximum value of the CW is 1023. When an ACK signal has been received for data of the transmission #N+1, the enlarged CW returns to the initial value at transmission #N+2 (i.e., Backoff=Random([0, CWmin−1]); n=0). In the case of Wi-Fi, whether reception of the previous transmission #N has been successful or has failed must be determined before starting LBT for the transmission #N+1. The wireless LAN device transmits data to a single destination, performs management on whether or not an ACK signal has been received from the single destination, and determines a backoff value for a next transmission according to whether or not an ACK signal has been received from the single destination. The maximum time length of data transmission is set as a maximum transmit duration (MTD). In Japan, the maximum time length is 4 ms.

Licensed-assisted access (LAA) is being studied in the standardization of specifications for a next generation mobile communication system in the third generation partnership project (3GPP) (for example, see Non-Patent Literature 2). LAA is a technology for performing long term evolution (LTE) communication while sharing a frequency band with another wireless communication system. A wireless station (a base station (eNB) or a terminal (UE)), to which LAA is applied, has an LBT function to avoid radio interference with another wireless communication system such as a Wi-Fi communication system which uses the same frequency band.

The LBT function of LAA performs the following processes.

Comparing the power level of a frequency band in use, which has been acquired by carrier-sense, with a threshold value and determining that the status is busy if the power level of the frequency band in use is greater than the threshold value and the status is idle if the power level is equal to or less than the threshold value.

Performing transmission if the status is kept idle for a set waiting time which is the sum of a fixed waiting time and a randomly determined waiting time (a backoff time (Backoff)).

CITATION LIST

Patent Literature

[Patent Literature 1]
Japanese Unexamined Patent Application, First Publication No. 2014-165512

Non-Patent Literature

[Non-Patent Literature 1]
IEEE Std 802.11ac™-2013
[Non-Patent Literature 2]
3 GPP, "TR 36.889"

SUMMARY OF INVENTION

Technical Problem

FIG. 16 is an explanatory view of problems 1 and 2 among some problems of the LBT function of LAA. Different destinations are set in subframes for each of transmissions #N, #N+1, and #N+2. For example, four subframes are used for the transmission #N. The first subframe #1 includes data for transmission to destinations #i and #j. The second subframe #2 includes data for transmission to destinations #i and #k. The third subframe #3 includes data for transmission to a destination #j. The fourth subframe #4 includes data for transmission to the destination #i. Subframes are also used to transmit a feedback signal for the transmission #N of the base station. The subframes in the feedback signal correspond respectively to the subframes of data transmission from the base station. For example, the feedback signal includes an ACK signal from the destination #i to the base station and a negative acknowledgement (NACK) signal from the destination #j to the base station. The feedback signal for the transmission #N includes six responds (ACK and NACK signals) and the CW is updated on the basis of the feedback signal. A backoff time included in a waiting time before the transmission N+2 is performed is determined on the basis of the updated CW.

(Problem 1) At a single data transmission, the LAA base station can transmit data to a plurality of destination terminals. When data is simultaneously transmitted to a plurality of destinations, the LAA base station performs management on whether or not an ACK signal and an NACK signal have been received from each destination. Here, in LAA, whether the previous transmission #N has been successful or has failed is not always all determined before LBT for the transmission #N+1 starts. Before LBT for the transmission #N+1 starts, an ACK signal and an NACK signal may fail to be received from at least one of the plurality of destinations to which data has been transmitted at the transmission #N. Therefore, it is not possible to determine a backoff value for LBT of LAA using the LBT method such as that of the related-art Wi-Fi LBT technology in which the wireless LAN device transmits data to a single destination, performs management on whether or not an ACK signal has been received from the single destination, and determines a backoff value for a next transmission according to whether or not an ACK signal has been received from the single destination.

(Problem 2) In LAA, ACK signals or NACK signals are returned from a plurality of destinations to which data has been transmitted at the transmission #N. Therefore, using the LBT method such as that of the related-art Wi-Fi LBT technology in which the wireless LAN device transmits data to a single destination, performs management on whether or not an ACK signal has been received from the single destination, and determines a backoff value for a next transmission according to whether or not an ACK signal has been received from the single destination, it is not possible to determine a backoff value for LBT of LAA in the case in which ACK signals or NACK signals are returned from a plurality of destinations in LAA.

The present invention has been made in view of such circumstances and it is an object of the present invention to provide a wireless communication device, a transmission method, and a computer program which can appropriately determine a waiting time when transmission to a plurality of destinations is performed.

Solution to Problem (1) An aspect of the present invention is a wireless communication device including a transmission unit configured to transmit a signal to a plurality of destinations after waiting for a common waiting time set for transmission to the plurality of destinations, a counter configured to update a counter value on the basis of acknowledgement information from each destination for the signal transmitted by the transmission unit, and an update determination unit configured to determine a settable range of the common waiting time which is to be set for transmission to a plurality of scheduled transmission destinations according to the counter value, wherein the transmission unit is configured to determine the common waiting time for transmission to the plurality of scheduled transmission destinations on the basis of the settable range determined by the update determination unit.

(2) An aspect of the present invention is the wireless communication device according to the above (1), further including a reception failure counter configured to update a reception failure counter value for each destination on the basis of the acknowledgement information from each destination for a signal transmitted by the transmission unit, wherein the counter is configured to update the counter value on the basis of the reception failure counter value.

(3) An aspect of the present invention is the wireless communication device according to the above (2), further including a reception failure counter value history recording unit configured to record a history of the reception failure counter value, wherein the counter is configured to update the counter value on the basis of the history of the reception failure counter value.

(4) An aspect of the present invention is the wireless communication device according to any one of the above (1) to (3), further including an acknowledgement information history recording unit configured to record a history of the acknowledgement information, wherein the counter is configured to update the counter value on the basis of the history of the acknowledgement information.

(5) An aspect of the present invention is a wireless communication device including a transmission unit configured to transmit a signal to a plurality of destinations after waiting for a common waiting time set for transmission to the plurality of destinations, a reception failure flag management unit configured to update a reception failure flag for each destination on the basis of acknowledgement information from each destination for the signal transmitted by the transmission unit, a counter configured to update a counter value on the basis of the reception failure flags of a plurality of scheduled transmission destinations, and an update determination unit configured to determine a settable range of the common waiting time which is to be set for transmission to the plurality of scheduled transmission destinations according to the counter value, wherein the transmission unit is configured to determine the common waiting time for transmission to the plurality of scheduled transmission destinations on the basis of the settable range determined by the update determination unit.

(6) An aspect of the present invention is the wireless communication device according to the above (5), further including an acknowledgement information history recording unit configured to record a history of the acknowledgement information, wherein the reception failure flag management unit is configured to update the counter value on the basis of the history of the acknowledgement information.

(7) An aspect of the present invention is a wireless communication device including a transmission unit configured to transmit a signal to a plurality of destinations after waiting for a common waiting time set for transmission to the plurality of destinations, a reception failure counter management unit configured to update a reception failure counter value for each destination on the basis of acknowledgement information from each destination for the signal transmitted by the transmission unit, a counter configured to update a counter value on the basis of the reception failure counter values of a plurality of scheduled transmission destinations, and an update determination unit configured to determine a settable range of the common waiting time which is to be set for transmission to the plurality of scheduled transmission destinations according to the counter value, wherein the transmission unit is configured to determine the common waiting time for transmission to the plurality of scheduled transmission destinations on the basis of the settable range determined by the update determination unit.

(8) An aspect of the present invention is the wireless communication device according to the above (7), wherein the counter is configured to select the reception failure counter value used to update the counter value from the reception failure counter values of the plurality of scheduled transmission destinations on the basis of the amount of communication resources allocated to each of the plurality of scheduled transmission destinations.

(9) An aspect of the present invention is a transmission method for a wireless communication device, the transmission method including a transmission step including transmitting a signal to a plurality of destinations after waiting for a common waiting time set for transmission to the plurality of destinations, an update step including updating a counter value on the basis of acknowledgement information from each destination for the signal transmitted in the transmission step, an update determination step including determining a settable range of the common waiting time which is to be set for transmission to a plurality of scheduled transmission destinations according to the counter value, and a determination step including determining the common waiting time for transmission to the plurality of scheduled transmission destinations on the basis of the settable range determined in the update determination step.

(10) An aspect of the present invention is a transmission method for a wireless communication device, the transmission method including a transmission step including transmitting a signal to a plurality of destinations after waiting for a common waiting time set for transmission to the plurality of destinations, a reception failure flag management step including updating a reception failure flag for each destination on the basis of acknowledgement information from each destination for the signal transmitted in the transmission step, an update step including updating a counter value on the basis of the reception failure flags of a plurality of scheduled transmission destinations, an update determination step including determining a settable range of the common waiting time which is to be set for transmission to the plurality of scheduled transmission destinations according to the counter value, and a determination step including determining the common waiting time for transmission to the plurality of scheduled transmission destinations on the basis of the settable range determined in the update determination step.

(11) An aspect of the present invention is a transmission method for a wireless communication device, the transmission method including a transmission step including transmitting a signal to a plurality of destinations after waiting for a common waiting time set for transmission to the plurality of destinations, a reception failure counter management step including updating a reception failure counter value for each destination on the basis of acknowledgement information from each destination for the signal transmitted in the transmission step, an update step including updating a counter value on the basis of the reception failure counter values of a plurality of scheduled transmission destinations, an update determination step including determining a settable range of the common waiting time which is to be set for transmission to the plurality of scheduled transmission destinations according to the counter value, and a determination step including determining the common waiting time for transmission to the plurality of scheduled transmission destinations on the basis of the settable range determined in the update determination step.

(12) An aspect of the present invention is a computer program causing a computer of a wireless communication device to realize a transmission function configured to transmit a signal to a plurality of destinations after waiting for a common waiting time set for transmission to the plurality of destinations, an update function configured to update a counter value on the basis of acknowledgement information from each destination for the signal transmitted by the transmission function, an update determination function configured to determine a settable range of the common waiting time which is to be set for transmission to a plurality of scheduled transmission destinations according to the counter value, and a determination function configured to determine the common waiting time for transmission to the plurality of scheduled transmission destinations on the basis of the settable range determined by the update determination function.

(13) An aspect of the present invention is a computer program causing a computer of a wireless communication device to realize a transmission function configured to transmit a signal to a plurality of destinations after waiting for a common waiting time set for transmission to the plurality of destinations, a reception failure flag management function configured to update a reception failure flag for each destination on the basis of acknowledgement information from each destination for the signal transmitted by the transmission function, an update function configured to update a counter value on the basis of the reception failure flags of a plurality of scheduled transmission destinations, an update determination function configured to determine a settable range of the common waiting time which is to be set for transmission to the plurality of scheduled transmission destinations according to the counter value, and a determination function configured to determine the common waiting time for transmission to the plurality of scheduled transmission destinations on the basis of the settable range determined by the update determination function.

(14) An aspect of the present invention is a computer program causing a computer of a wireless communication device to realize a transmission function configured to transmit a signal to a plurality of destinations after waiting for a common waiting time set for transmission to the plurality of destinations, a reception failure counter management function configured to update a reception failure counter value for each destination on the basis of acknowledgement information from each destination for the signal transmitted by the transmission function, an update function configured to update a counter value on the basis of the reception failure counter values of a plurality of scheduled transmission destinations, an update determination function configured to determine a settable range of the common waiting time which is to be set for transmission to the plurality of scheduled transmission destinations according to the counter value, and a determination function configured to determine the common waiting time for transmission to the plurality of scheduled transmission destinations on the basis of the settable range determined by the update determination function.

Advantageous Effects of Invention

According to the present invention, it is possible to obtain an advantageous effect that it is possible to appropriately determine a waiting time when transmission to a plurality of destinations is performed.

DESCRIPTION OF EMBODIMENTS

Hereinafter, embodiments of the present invention will be described with reference to the drawings.

Figure 1:
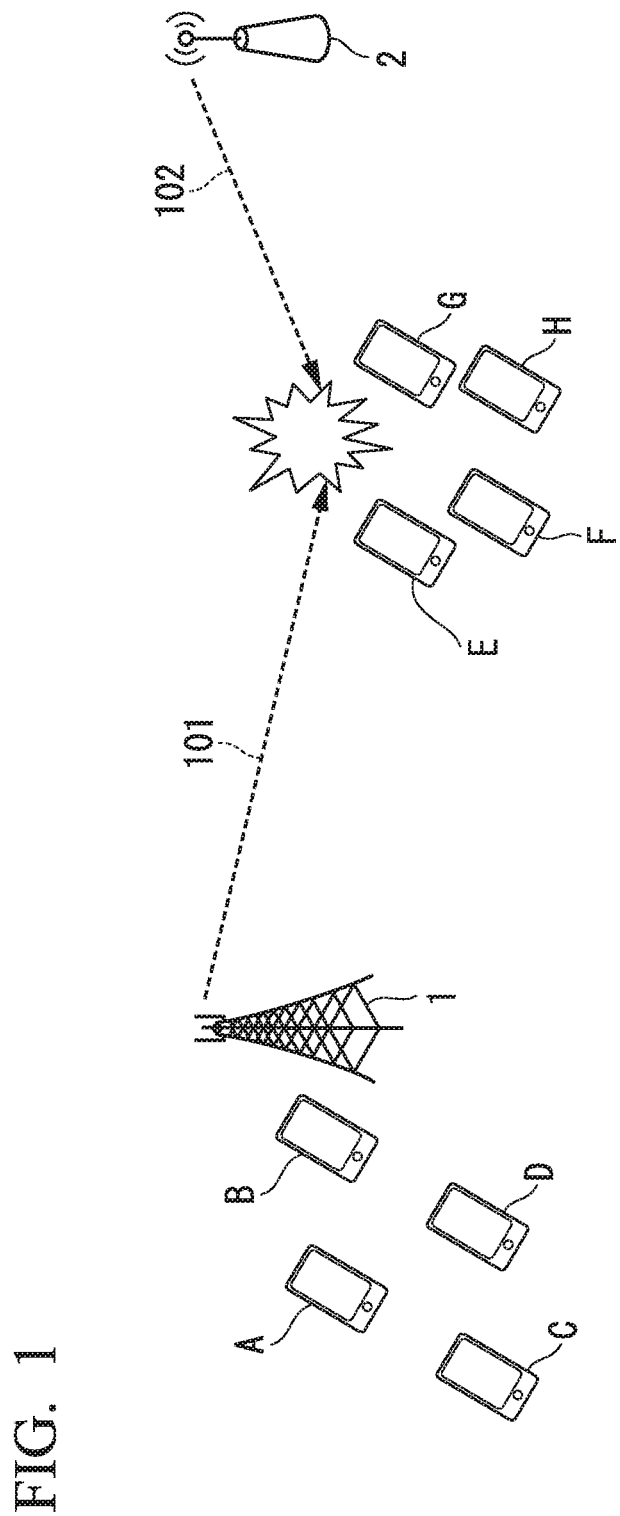
FIG. 1 is a configuration diagram showing an example of a wireless communication system according to an embodiment of the present invention.

FIG. 1 is a configuration diagram showing an example of a wireless communication system according to an embodiment of the present invention. The present embodiment will be described with reference to an LAA wireless communication system as an example of a wireless communication system. In FIG. 1, a base station 1 is an LAA base station. The base station 1 is an example of a wireless communication device according to the present invention. Terminals A to H are LAA terminals. The base station 2 is a base station of a wireless communication system different from the wireless communication system of the base station 1. The base stations 1 and 2 share the same frequency band.

The terminals A to D are present near the base station 1 and do not receive interference of radio waves transmitted from the base station 2. On the other hand, the terminals E to H are present at positions where they receive interference of radio waves transmitted from the base station 2. Therefore, in the terminals E to H, there is a possibility that retransmissions may occur due to collisions between wireless signals 101 from the base station 1 and wireless signals 102 from the base station 2.

Embodiments of the base station 1 (wireless communication device) described above will be described below.

[First Embodiment]

Figure 2:
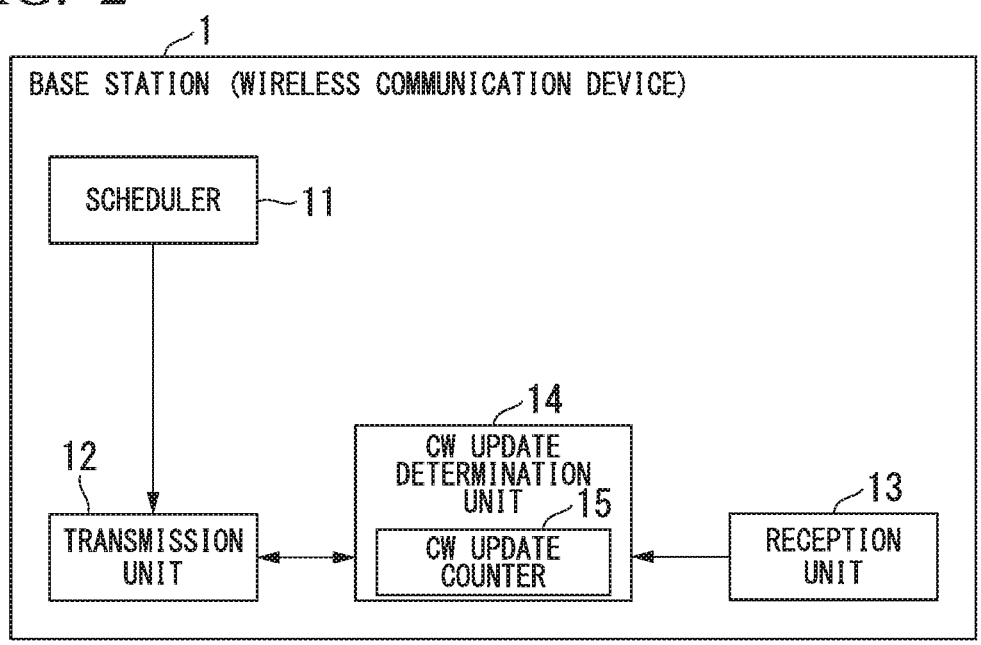
FIG. 2 is a schematic configuration diagram of a base station 1 according to a first embodiment.

FIG. 2 is a schematic configuration diagram of the base station 1 according to a first embodiment. In FIG. 2, the base station 1 includes a scheduler 11, a transmission unit 12, a reception unit 13, and a CW update determination unit 14. The CW update determination unit 14 includes a CW update counter 15.

The scheduler 11 determines terminals which are scheduled as next transmission destinations. The number of the scheduled transmission destinations is one or more. The transmission unit 12 transmits data to the scheduled transmission destination(s) determined by the scheduler 11. The transmission unit 12 performs LBT before transmitting data. When the transmission unit 12 performs LBT for transmission to a plurality of destinations, the transmission unit 12 performs transmission to the plurality of destinations if the status is kept idle for a common waiting time for the plurality of destinations. The common waiting time for the plurality of destinations is the sum of a fixed waiting time and a randomly determined waiting time (backoff time).

The reception unit 13 receives a signal from a terminal that has established a connection with the base station 1. The reception unit 13 outputs, to the CW update determination unit 14, information regarding an ACK signal and a NACK signal from each destination for data transmitted from the transmission unit 12. The ACK signal and the NACK signal are acknowledgement information.

In the CW update determination unit 14, the CW update counter 15 holds a CW update counter value. The CW update counter 15 updates the CW update counter value on the basis of an ACK signal and a NACK signal from each destination for the data transmitted by the transmission unit 12. In accordance with the CW update counter value, the CW update determination unit 14 determines a maximum CW value to be applied to LBT before transmission to the scheduled transmission destinations. The maximum CW value corresponds to a settable range of the backoff time. The settable range of the backoff time corresponds to at least part of a settable range of the common waiting time for the plurality of scheduled transmission destinations.

On the basis of the maximum CW value determined by the CW update determination unit 14, the transmission unit 12 determines a backoff time to be applied to LBT before transmission to the scheduled transmission destinations. The backoff time is determined, for example, according to a backoff value randomly selected from a range of 0 to CW with a uniform probability, similar to the Wi-Fi LBT technology. When there are a plurality of scheduled transmission destinations, the transmission unit 12 determines, on the basis of the maximum CW value determined by the CW update determination unit 14, a common backoff time for the plurality of destinations which is to be applied to LBT before transmission to the plurality of scheduled transmission destinations.

Figure 3:
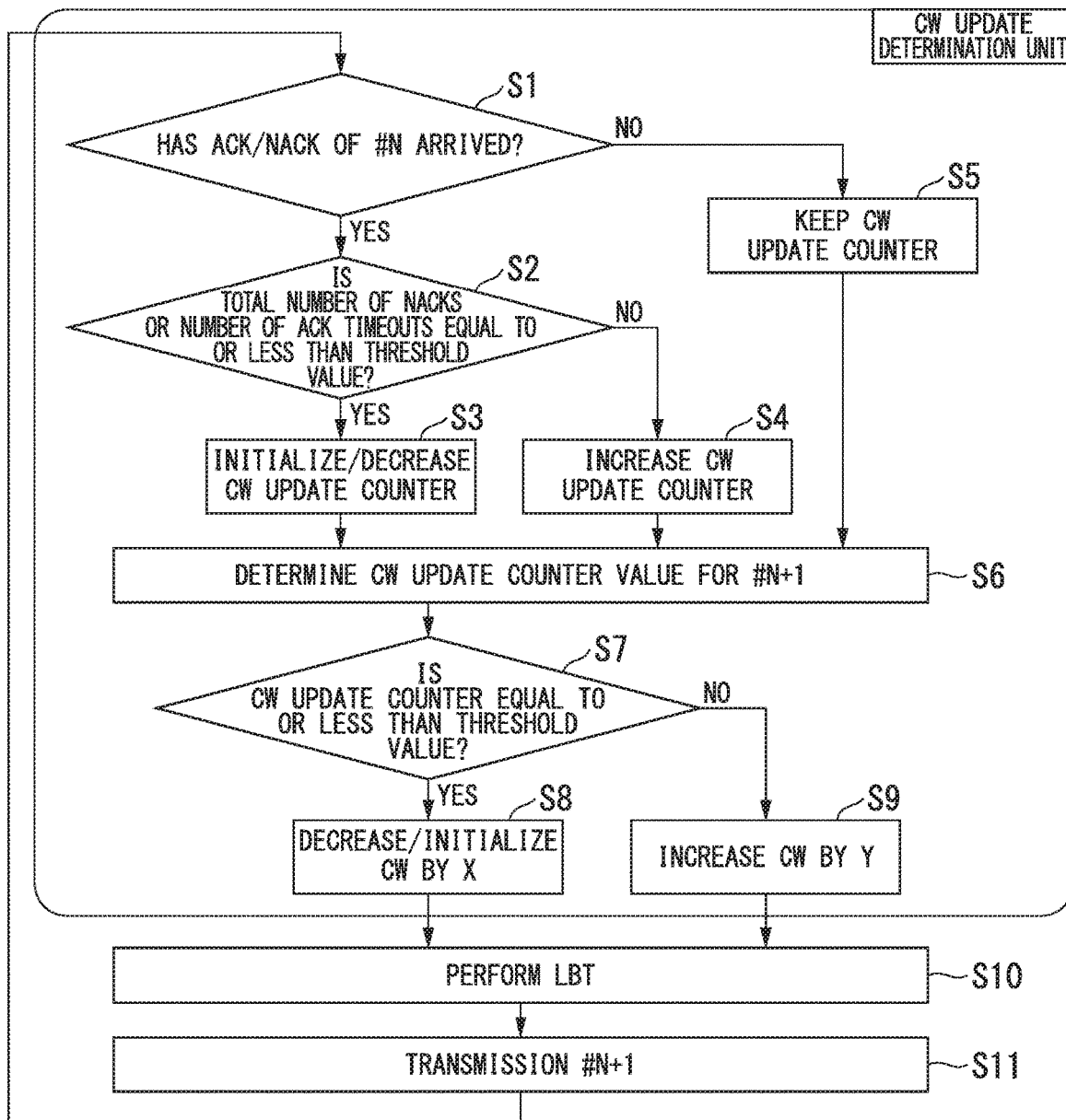
FIG. 3 is a flowchart of example 1 of a transmission method according to the first embodiment.
Figure 4:
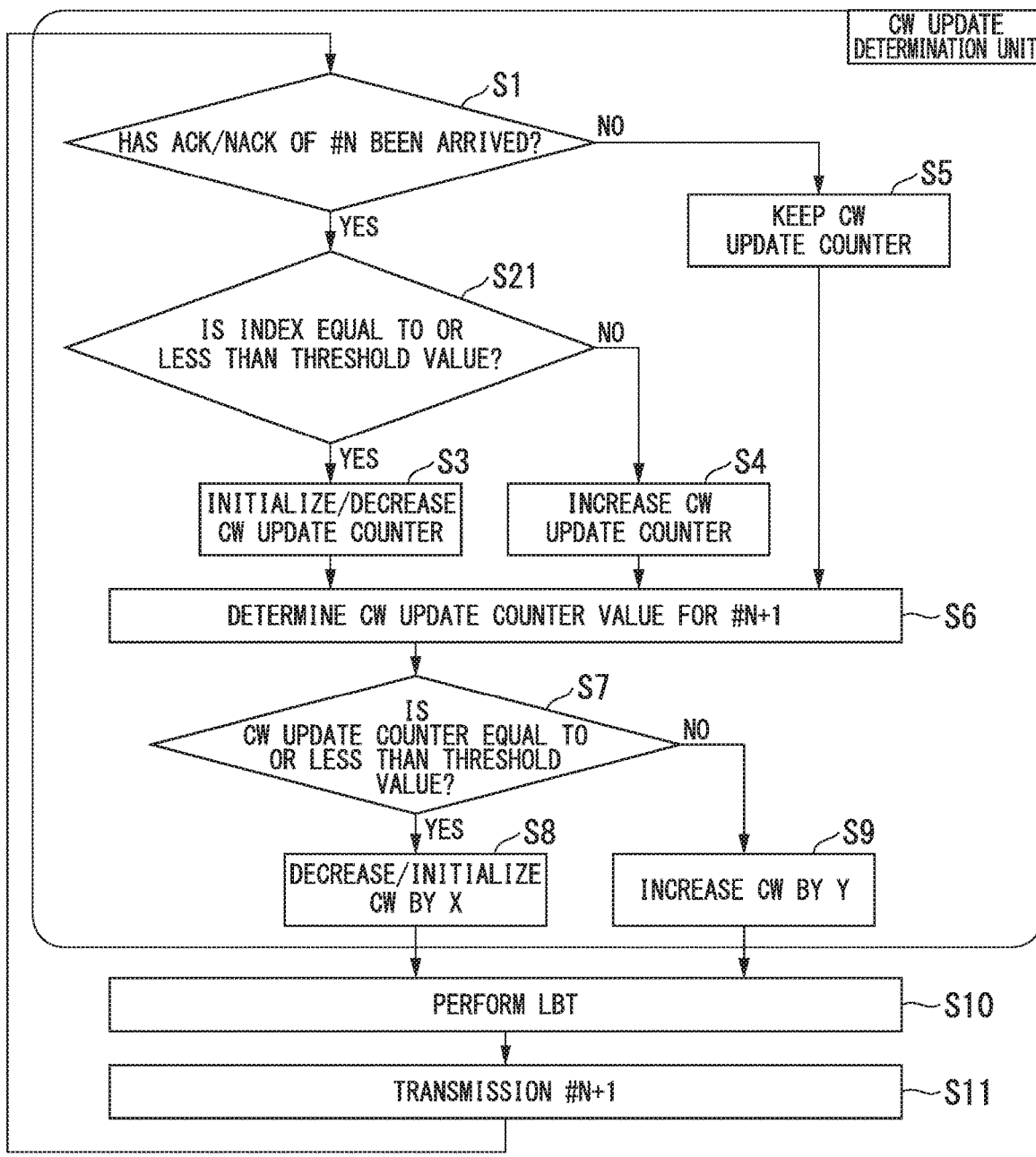
FIG. 4 is a flowchart of example 2 of the transmission method according to the first embodiment.

Next, a transmission operation of the base station 1 according to the first embodiment will be described with reference to FIGS. 3 and 4. FIG. 3 is a flowchart of example 1 of the transmission method according to the first embodiment. FIG. 4 is a flowchart of example 2 of the transmission method according to the first embodiment.

[Example 1 of Transmission Method According to First Embodiment]

Example 1 of the transmission method according to the first embodiment will now be described with reference to FIG. 3. Acknowledgment information f_(N, m) is input from the reception unit 13 to the CW update determination unit 14. The acknowledgement information f_(N, m) is information of all ACK and NACK signals included in a feedback signal F_(N, m) that the reception unit 13 has received from destinations to which the transmission unit 12 has performed transmission #N. Here, m is an integer from 1 to M. M is the number of subframes transmitted by the transmission unit 12 at the transmission #N.

In LAA, "hybrid automatic repeat request (HARQ) ACKs and NACKs" included in physical uplink control channel (PUCCH) resources (on a licensed band or an unlicensed band) of a UL subframe #m+x correspond to ACK and NACK signals included in the feedback signal F_(N, m). The value of x in the above "subframe #m+x" is 4 in LTE, but is being studied in LAA.

Figure 16:
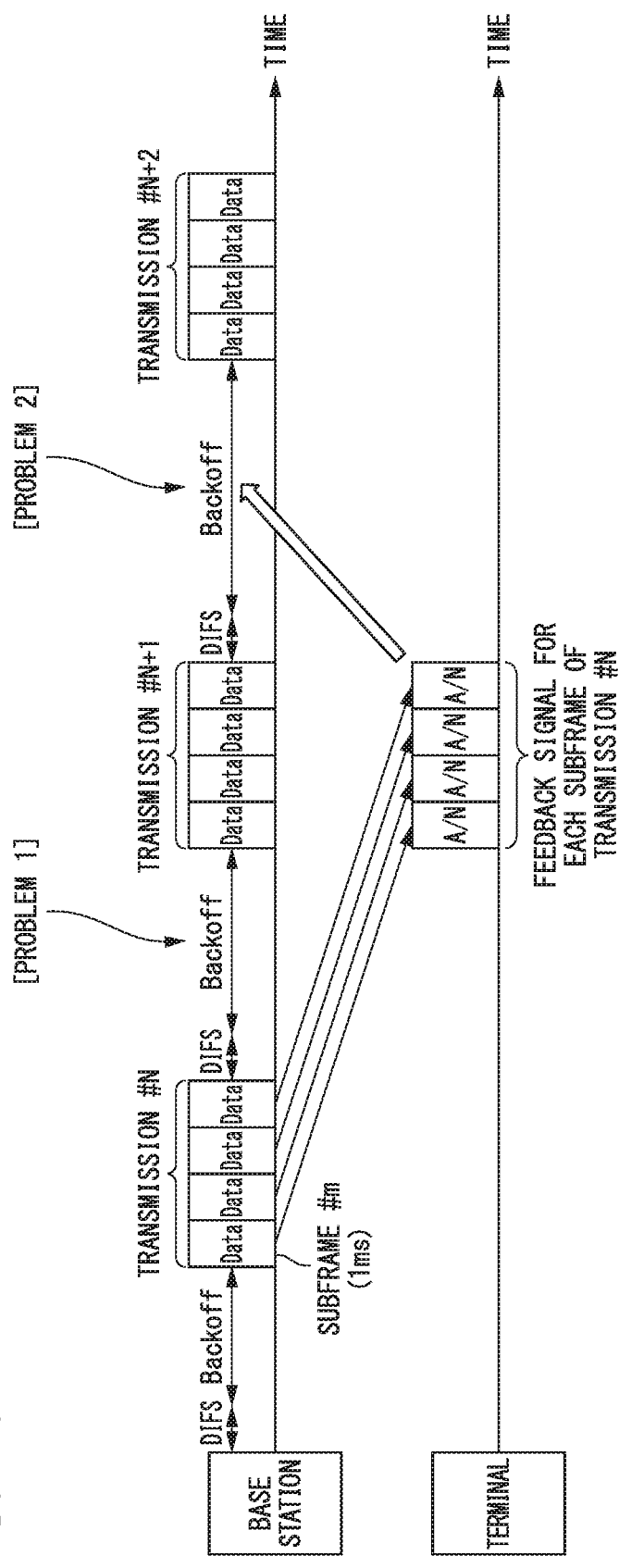
FIG. 16 is an explanatory diagram of problems 1 and 2 in a related-art LBT function of LAA.

In response to the input of the acknowledgement information f_(N, m) from the reception unit 13, the CW update determination unit 14 outputs, to the transmission unit 12, a maximum CW value to be applied to LBT before transmission of the transmission #N+1. Generally, l=1, but l=2 if the acknowledgement information f_(N, m) has not yet been input upon the LBT before transmission of the transmission #N+1 as described above (in Problem 1) with reference to FIG. 16. For the sake of simplicity, the following description will be given assuming that l=1.

(Step S1) On the basis of the acknowledge information f_(N, m), the CW update determination unit 14 determines whether or not an ACK signal or a NACK signal for the transmission #N has been received. If the result of the determination is that an ACK signal or a NACK signal for the transmission #N has been received, the CW update determination unit 14 proceeds to step S2 and otherwise proceeds to step S5.

(Step S2) The CW update determination unit 14 determines whether or not the total number of received NACK signals for the transmission #N or the number of ACK signal timeouts for the transmission #N is equal to or less than a threshold value. If the result of the determination is that the total number of received NACK signals or the number of ACK signal timeouts is equal to or less than the threshold value, the CW update determination unit 14 proceeds to step S3 and otherwise proceeds to step S4.

In another example of the above step S2, the CW update determination unit 14 may determine whether or not the total number of received NACK signals for the transmission #N or the number of ACK signal timeouts for the transmission #N is equal to or greater than a threshold value, and may proceed to step S4 if the result of the determination is that it is equal to or greater than the threshold value and otherwise proceed to step S3.

(Step S3) The CW update counter 15 initializes or decreases the CW update counter value.

(Step S4) The CW update counter 15 increases the CW update counter value.

(Step S5) The CW update counter 15 keeps the CW update counter value unchanged.

(Step S6) The CW update determination unit 14 acquires the CW update counter value for the transmission #N+1 from the CW update counter 15.

(Step S7) The CW update determination unit 14 determines whether or not the acquired CW update counter value is equal to or less than a threshold value. If the result of the determination is that the acquired CW update counter value is equal to or less than the threshold value, the CW update determination unit 14 proceeds to step S8 and otherwise proceeds to step S9.

(Step S8) The CW update determination unit 14 initializes the maximum CW value or decreases the maximum CW value by X, such that the resulting value is less than the current value by X. The value of X may be arbitrarily set.

(Step S9) The CW update determination unit 14 increases the maximum CW value by Y, such that the resulting value is greater than the current value by Y. The value of Y may be arbitrarily set.

(Step S10) The CW update determination unit 14 outputs the resulting maximum CW value of step S8 or step S9 to the transmission unit 12 for the transmission #N+1. On the basis of the maximum CW value, the transmission unit 12 determines a backoff time to be applied to LBT before transmission to destinations to which transmission has been scheduled to be performed at the transmission #N+1.

The following are examples of a condition for initializing the CW update counter value.

(Example 1 of Initialization Condition)

In step S3, the CW update counter 15 initializes the CW update counter value in any case.

(Example 2 of Initialization Condition)

If only ACK signals are included in the acknowledgement information f_(N, m), the CW update counter 15 initializes the CW update counter value. In the case of example 2 with this initialization condition, if at least one NACK signal is included in the acknowledgement information f_(N, m), the CW update counter 15 may keep the CW update counter value unchanged, regardless of the result of the above step S2. This can achieve an improved interference avoidance rate.

[Example 2 of Transmission Method According to First Embodiment]

The example 2 of the transmission method according to the first embodiment will now be described with reference to FIG. 4. In FIG. 4, portions corresponding to steps of FIG. 3 are denoted by the same reference signs as those of FIG. 3 and descriptions thereof are omitted. The example 2 of the transmission method according to the first embodiment shown in FIG. 4 differs from the example 1 of the transmission method according to the first embodiment shown in FIG. 3 only in terms of a portion corresponding to step S2 of the example 1 and the other steps are similar.

Acknowledgment information f_(N, m) is input from the reception unit 13 to the CW update determination unit 14. In response to the input of the acknowledgement information f_(N, m) from the reception unit 13, the CW update determination unit 14 outputs a maximum CW value to be applied to LBT before transmission of the transmission #N+1 to the transmission unit 12.

In FIG. 4, the CW update determination unit 14 proceeds to step S21 if the result of step S1 is that an ACK signal or a NACK signal for the transmission #N has been received and proceeds to step S5 if both an ACK signal and a NACK signal for the transmission #N have not been received.

(Step S21) The CW update determination unit 14 determines whether or not an index is equal to or less than a threshold value. This index is "(the total number of received NACK signals or the number of ACK signal timeouts)/(the total number of received ACK signals+(the total number of received NACK signals or the number of ACK signal timeouts))." If the result of the determination is that the index is equal to or less than the threshold value, the CW update determination unit 14 proceeds to step S3 and otherwise proceeds to step S4.

In another example of the above step S21, the CW update determination unit 14 may determine whether or not the index "(the total number of received NACK signals or the number of ACK signal timeouts)/(the total number of received ACK signals+(the total number of received NACK signals or the number of ACK signal timeouts))" is equal to or greater than a threshold value, and may proceed to step S4 if the result of the determination is that the index is equal to or greater than the threshold value and otherwise proceed to step S3.

In LAA, an ACK signal and a NACK signal of each destination are returned for each DL subframe. Therefore, the total number of ACK signals and NACK signals returned changes according to the number of destinations allocated to the DL subframe #m of the transmission #N. According to the example 2 of the transmission method according to the first embodiment, using the index "(the total number of received NACK signals or the number of ACK signal timeouts)/(the total number of received ACK signals+(the total number of received NACK signals or the number of ACK signal timeouts))," it is possible to determine whether to update the CW update counter value under a certain condition, regardless of the number of destinations allocated to the DL subframe #m of the transmission #N.

The following are examples of a condition for initializing the CW update counter value.

(Example 1 of Initialization Condition)

In step S3, the CW update counter 15 initializes the CW update counter value in any case.

(Example 2 of Initialization Condition)

If the index "(the total number of received NACK signals or the number of ACK signal timeouts)/(the total number of received ACK signals+(the total number of received NACK signals or the number of ACK signal timeouts))" is 0, the CW update counter 15 initializes the CW update counter value. In the case of example 2 with this initialization condition, if the index "(the total number of received NACK signals or the number of ACK signal timeouts)/(the total number of received ACK signals+(the total number of received NACK signals or the number of ACK signal timeouts))" is not 0, the CW update counter 15 may keep the CW update counter value unchanged, regardless of the result of the above step S21. This can achieve an improved interference avoidance rate.

The above is the description of the first embodiment.

[Second Embodiment]

Figure 5:
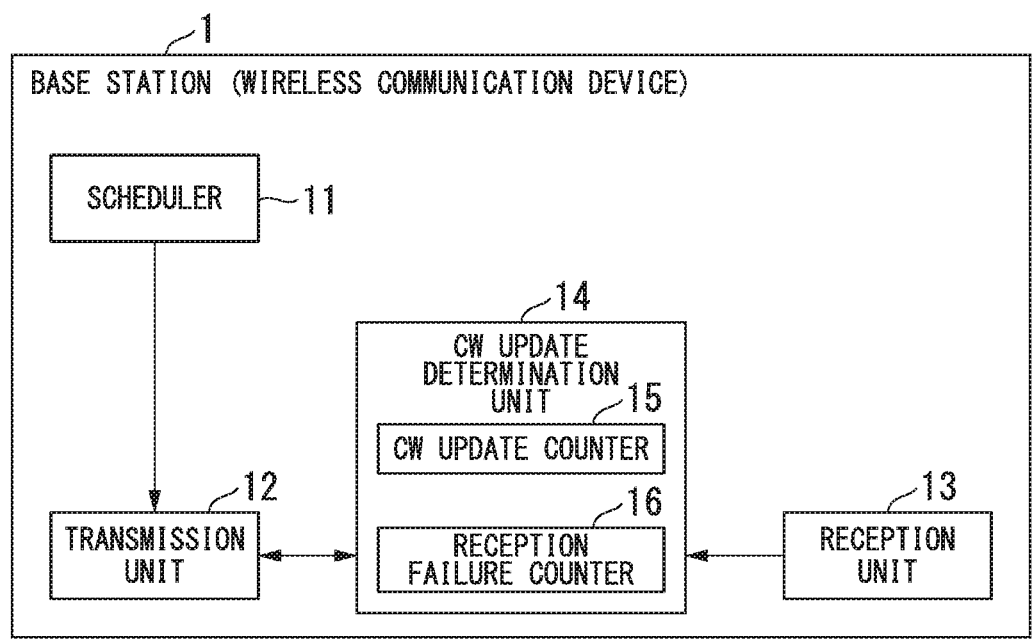
FIG. 5 is a schematic configuration diagram of a base station 1 according to a second embodiment.

FIG. 5 is a schematic configuration diagram of a base station 1 according to a second embodiment. In FIG. 5, portions corresponding to those of FIG. 2 are denoted by the same reference signs as those of FIG. 2 and descriptions thereof are omitted. The base station 1 according to the second embodiment shown in FIG. 5 includes a reception failure counter 16 in addition to the components of the CW update determination unit 14 of the base station 1 according to the first embodiment shown in FIG. 2. Hereinafter, differences from the first embodiment described above will be mainly described.

In the CW update determination unit 14, the reception failure counter 16 holds a reception failure counter value for each terminal that has established a connection with the base station 1. A terminal that has established a connection with the base station 1 is a destination to which the transmission unit 12 transmits data. The reception failure counter 16 updates the reception failure counter value for each destination on the basis of an ACK signal and a NACK signal from the destination for data transmitted by the transmission unit 12. The CW update counter 15 updates the CW update counter value on the basis of the reception failure counter value.

Figure 6:
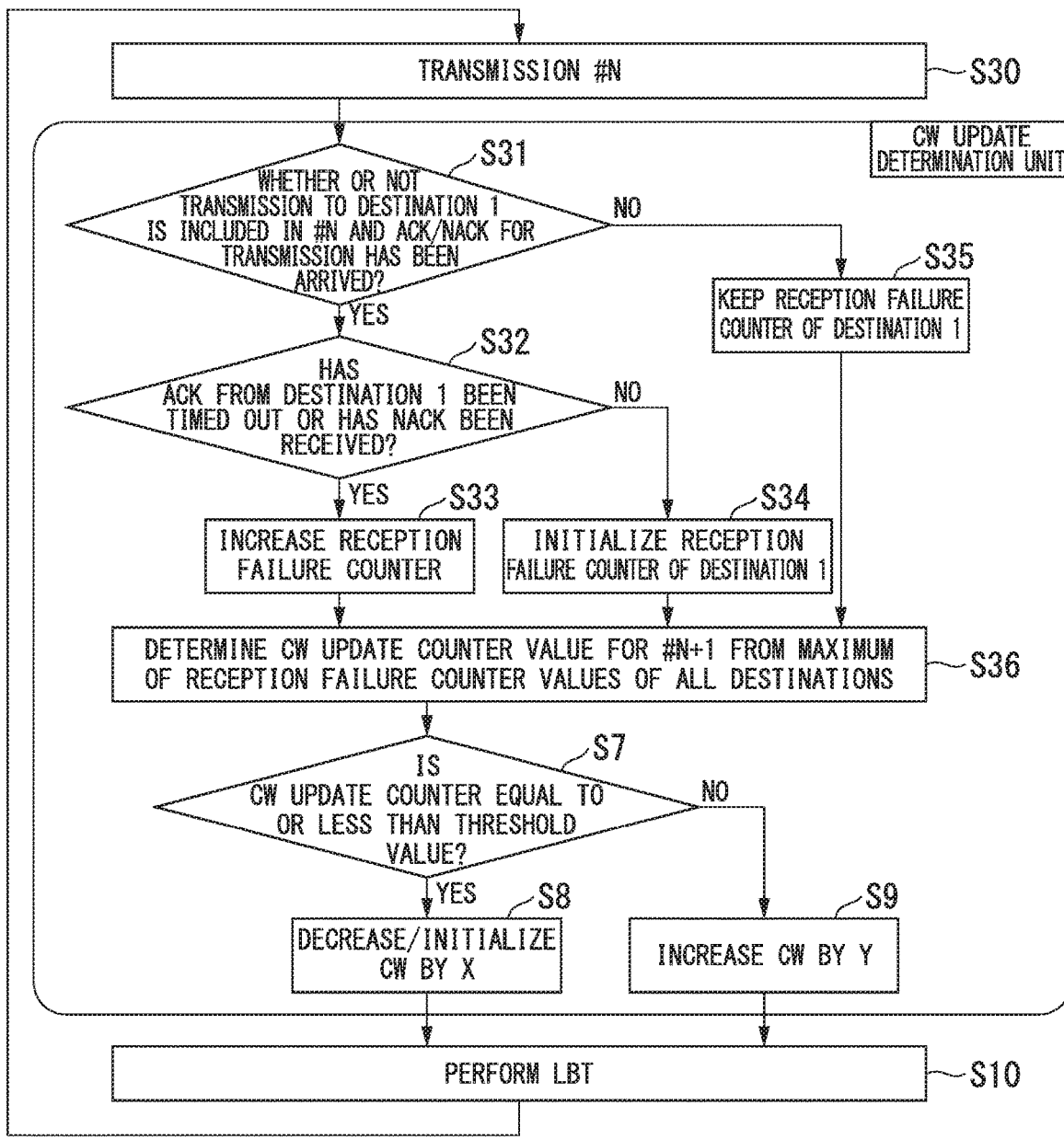
FIG. 6 is a flowchart of example 1 of a transmission method according to the second embodiment.
Figure 7:
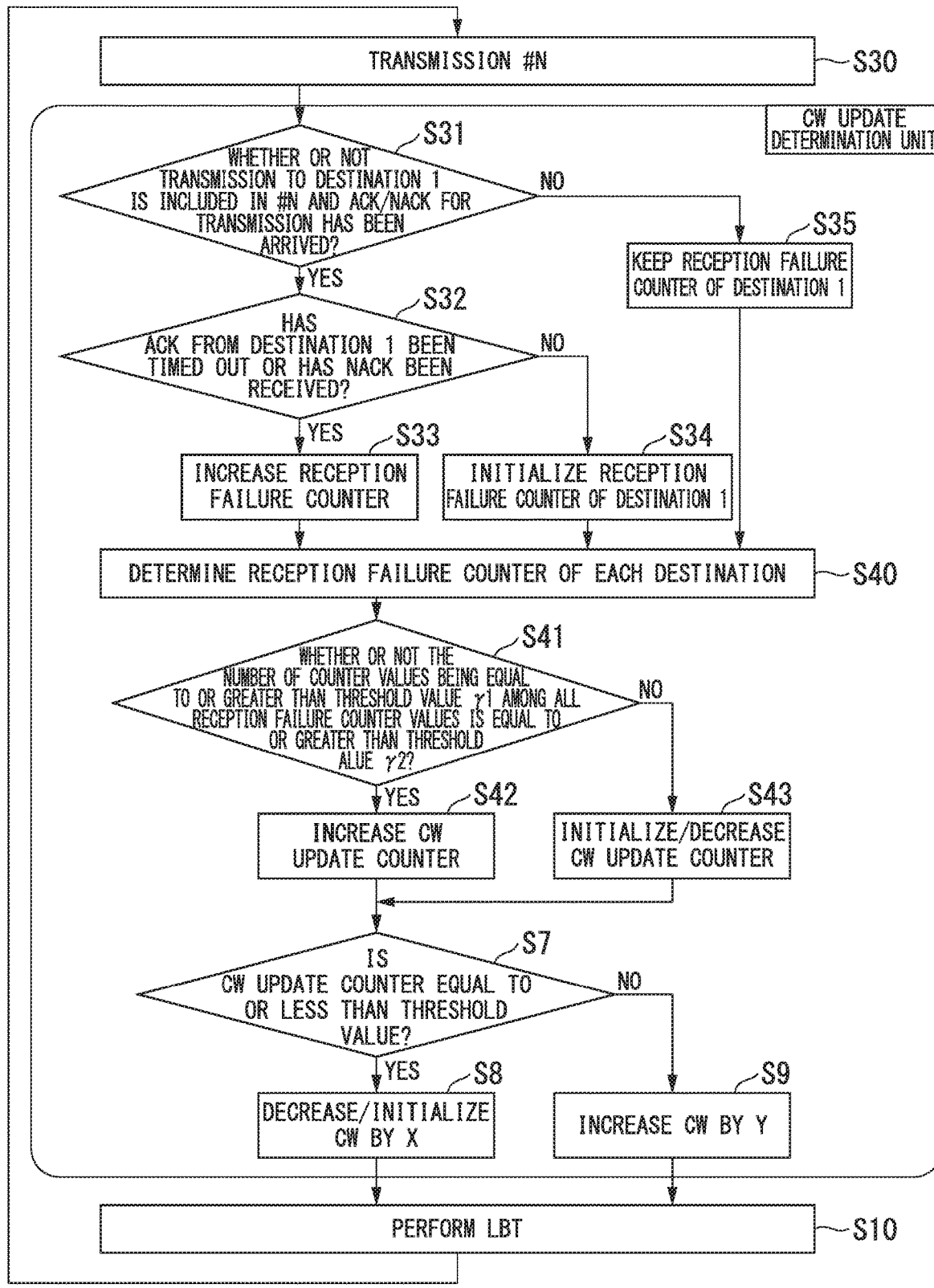
FIG. 7 is a flowchart of example 2 of the transmission method according to the second embodiment.

Next, a transmission operation of the base station 1 according to the second embodiment will be described with reference to FIGS. 6 and 7. FIG. 6 is a flowchart of example 1 of a transmission method according to the second embodiment. FIG. 7 is a flowchart of example 2 of the transmission method according to the second embodiment.

[Example 1 of Transmission Method According to Second Embodiment]

The example 1 of the transmission method according to the second embodiment will now be described with reference to FIG. 6. In FIG. 6, portions corresponding to steps of FIG. 3 are denoted by the same reference signs as those of FIG. 3 and descriptions thereof are omitted. The example 1 of the transmission method according to the second embodiment shown in FIG. 6 differs from the example 1 of the transmission method in the first embodiment shown in FIG. 3 in terms of the method of determining the CW update counter value.

Acknowledgment information f_(N, m) is input from the reception unit 13 to the CW update determination unit 14. In response to the input of the acknowledgement information f_(N, m) from the reception unit 13, the CW update determination unit 14 outputs a maximum CW value to be applied to LBT before transmission of the transmission #N+1 to the transmission unit 12.

(Step S30) The transmission unit 12 performs the transmission #N and the reception unit 13 inputs the acknowledgement information f_(N, m) to the CW update determination unit 14. The acknowledgement information f_(N, m) includes information on an ACK signal and a NACK signal for each destination.

Subsequently, processes of steps S31 to S35 are performed for each destination of the transmission #N. Here, one of the destinations of the transmission #N is referred to as destination 1 and the following description will be given with reference to the destination 1 as an example.

(Step S31) On the basis of the acknowledgement information f_(N, m), the CW update determination unit 14 determines whether or not an ACK signal or NACK signal for the transmission #N has been received from the destination 1. If the result of the determination is that an ACK signal or a NACK signal for the transmission #N has been received from the destination 1, the CW update determination unit 14 proceeds to step S32 and otherwise proceeds to step S35.

(Step S32) The CW update determination unit 14 determines whether or not an ACK signal timeout of the destination 1 has occurred or whether or not a NACK signal has been received from the destination 1. If the result of the determination is that an ACK signal timeout of the destination 1 has occurred or a NACK signal has been received from the destination 1, the CW update determination unit 14 proceeds to step S33 and otherwise proceeds to step S34.

(Step S33) The reception failure counter 16 increases a reception failure counter value of the destination 1.

(Step S34) The reception failure counter 16 initializes the reception failure counter value of the destination 1.

(Step S35) The reception failure counter 16 keeps the reception failure counter value of the destination 1 unchanged.

After the above processes of the steps S31 to S35 are performed for all destinations of the transmission #N, the CW update determination unit 14 proceeds to step S36.

(Step S36) The CW update determination unit 14 acquires all reception failure counter values from the reception failure counter 16. The CW update determination unit 14 selects a maximum value from the acquired reception failure counter values. The CW update counter 15 sets the selected maximum reception failure counter value as the CW update counter value. Thus, the CW update counter value for the transmission #N+1 is determined.

Subsequently, steps S7 to S10 are performed. Steps S7 to S10 are similar to those of the example 1 of the transmission method according to the first embodiment described above with reference to FIG. 3.

According to the example 1 of the transmission method according to the second embodiment, it is possible to enlarge the CW and to avoid collisions even when packet collisions have occurred in a small number of destinations.

For example, when an ACK signal has been received from a terminal as a condition for initializing each reception failure counter value of the reception failure counter 16, the reception failure counter value of the terminal may be initialized.

[Example 2 of Transmission Method According to Second Embodiment]

The example 2 of the transmission method according to the second embodiment will now be described with reference to FIG. 7. In FIG. 7, portions corresponding to steps of FIG. 6 are denoted by the same reference signs as those of FIG. 6 and descriptions thereof are omitted. The example 2 of the transmission method according to the second embodiment shown in FIG. 7 differs from the example 1 of the transmission method according to the second embodiment shown in FIG. 6 only in terms of portions (steps S40 to S43 of FIG. 7) corresponding to step S36 of the example 1 and the other steps are similar.

Acknowledgment information f_(N, m) is input from the reception unit 13 to the CW update determination unit 14. In response to the input of the acknowledgement information f_(N, m) from the reception unit 13, the CW update determination unit 14 outputs a maximum CW value to be applied to LBT before transmission of the transmission #N+1 to the transmission unit 12.

In FIG. 7, after processes of steps S31 to S35 are performed for all destinations of the transmission #N subsequent to step S30, the CW update determination unit 14 proceeds to step S40. Steps S30 to S35 are similar to those of the example 1 of the transmission method according to the second embodiment described above with reference to FIG. 6.

(Step S40) Each reception failure counter value of the reception failure counter 16 is determined.

(Step S41) The CW update determination unit 14 acquires all reception failure counter values from the reception failure counter 16. The CW update determination unit 14 determines whether or not a number of reception failure counter values, which are equal to or greater than a threshold value γ1 among the acquired reception failure counter values, is equal to or greater than a threshold value γ2. If the result of the determination is that the number of reception failure counter values being equal to or greater than the threshold value γ1 is equal to or greater than the threshold value γ2, the CW update determination unit 14 proceeds to step S42 and otherwise proceeds to step S43.

(Step S42) The CW update counter 15 increases the CW update counter value.

(Step S43) The CW update counter 15 initializes or decreases the CW update counter value.

Subsequently, steps S7 to S10 are performed. Steps S7 to S10 are similar to those of the example 1 of the transmission method according to the first embodiment described above with reference to FIG. 3.

According to the example 2 of the transmission method according to the second embodiment, it is possible to achieve both packet collision avoidance and an improvement in the utilization efficiency of time resources by enlarging the CW only when packet collisions have occurred at a number of destinations equal to a greater than a predetermined number. Thus, the CW is not enlarged in a situation where packet collisions have occurred only at a very small number of destinations, whereby it is possible to prevent LBT from being performed with the enlarged CW even before transmission to the other destinations and to prevent a reduction in the utilization efficiency of time resources.

The above is the description of the second embodiment.

[Modification 1]

The base station 1 according to the first embodiment or the second embodiment described above may further include an acknowledgement information history recording unit that records a history of acknowledgement information and the CW update counter 15 may update the CW update counter value on the basis of the history of acknowledgement information. Examples 1-1 and 1-2 of the method of updating the CW update counter value will be described below.

(Example 1-1 of Method of Updating CW Update Counter Value)

When the total number of received NACK signals or the number of ACK signal timeouts within a predetermined condition P in the past is equal to or greater than a threshold value, the CW update counter 15 increases the CW update counter value. For example, the CW update counter 15 may use a predetermined unit time (P ms) or a predetermined number of times (P times) of transmission by the transmission unit 12 as the predetermined condition P.

(Example 1-2 of Method of Updating CW Update Counter Value)

When an index "(the total number of received NACK signals or the number of ACK signal timeouts)/(the total number of received ACK signals+(the total number of received NACK signals or the number of ACK signal timeouts))" within a predetermined condition P in the past" is equal to or greater than a threshold value, the CW update counter 15 increases the CW update counter value. The predetermined condition P may be similar to that of the example 1-1 of the method of updating the CW update counter value.

[Modification 2]

The base station 1 according to the second embodiment may further include a reception failure counter value history recording unit that records a reception failure counter value history and the CW update counter 15 may update the CW update counter value on the basis of the reception failure counter value history. Examples 2-1 and 2-2 of the method of updating the CW update counter value will be described below.

(Example 2-1 of Method of Updating CW Update Counter Value)

The CW update counter 15 sets a maximum value among all reception failure counter values within a predetermined condition P in the past as the CW update counter value. The predetermined condition P may be similar to that of the example 1-1 of the method of updating the CW update counter value.

(Example 2-2 of Method of Updating CW Update Counter Value)

The CW update counter 15 increases the CW update counter value when a number of reception failure counter values which are equal to or greater than the threshold value γ1 within the predetermined condition P in the past among all reception failure counter values is equal to or greater than the threshold value γ2. The predetermined condition P may be similar to that of the example 1-1 of the method of updating the CW update counter value.

In the modifications 1 and 2 described above, the CW update counter 15 may provide a forgetting factor for each counter value within the predetermined condition P in the past to weight the counter value such that a most recent history is prioritized.

According to the first and second modifications described above, using the record of the past (history), it is possible to obtain the following advantageous effects.

For example, let us assume that a packet collision happens to occur at the latest transmission although a stable wireless environment with few packet collisions is continued. In this case, if the record of the past is not used, the CW is enlarged at the latest CW update despite that no packet collision occurs at the latest CW update without enlarging the CW, thus reducing the utilization efficiency of time resources. However, according to the first and second modifications, it is possible to prevent such a situation using the record of the past.

Also, let us assume that a packet collision does not happen occur at the latest transmission in a wireless environment with many packet collisions. In this case, if the record of the past is not used, the CW is initialized at the latest CW update, thus causing a packet collision at the next transmission. However, according to the first and second modifications, it is possible to prevent such a situation using the record of the past.

Figure 8:
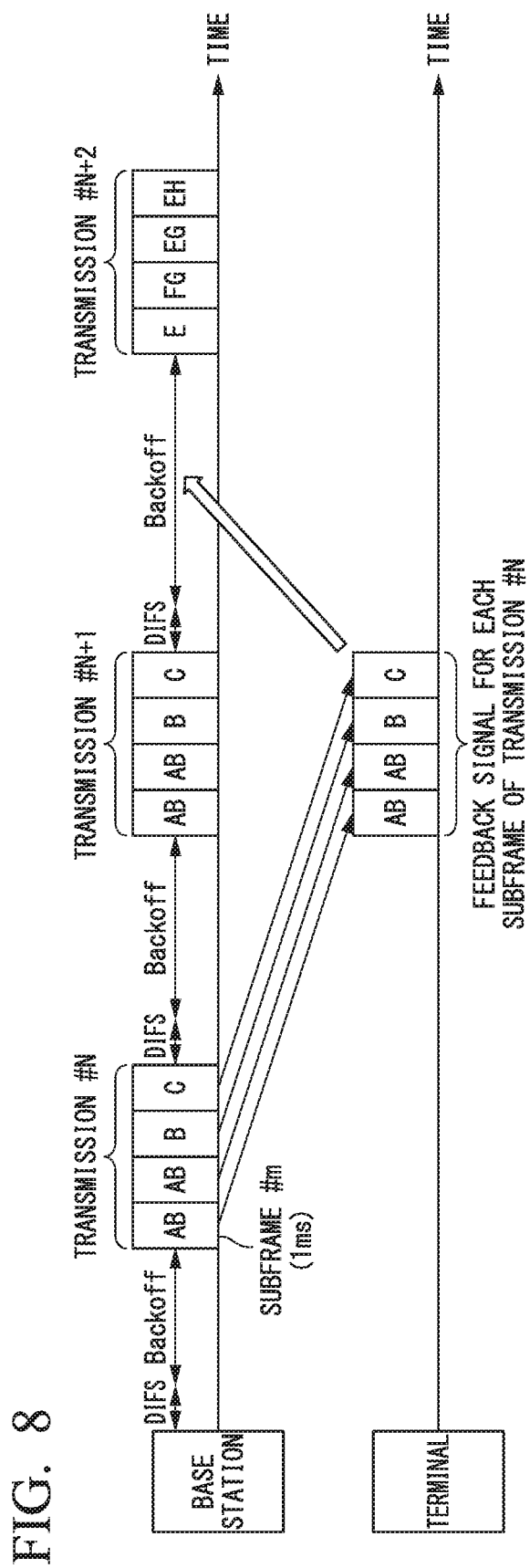
FIG. 8 is an explanatory diagram of a comparative example in which a backoff time to be applied to LBT before transmission to a plurality of scheduled transmission destinations is determined without taking into consideration the plurality of scheduled transmission destinations.

Next, third and fourth embodiments will be described. The third and fourth embodiments are intended to determine a back-off time to be applied to LBT before transmission to a plurality of scheduled transmission destinations taking into consideration the plurality of scheduled transmission destinations. FIG. 8 is an explanatory diagram of a comparative example in which a backoff time to be applied to LBT before transmission to a plurality of scheduled transmission destinations is determined without taking into consideration the plurality of scheduled transmission destinations. Letters (A to H) in subframes transmitted from the base station indicate destination stations of data included in the subframes. Letters (A to C) in subframes of feedback signals transmitted from terminals indicate source stations of the feedback signals (ACK and NACK signals) included in the subframes. After terminating the transmission #N, the base station allocates destination stations of transmission #N+1. After terminating the transmission #N+1, the base station allocates destination stations of transmission #N+2. In FIG. 8, the base station determines a backoff time to be applied to LBT before transmission of the transmission #N+2 on the basis of ACK and NACK signals for the transmission #N. The plurality of scheduled transmission destinations of the transmission #N+2 are different from the plurality of scheduled transmission destinations of the transmission #N. Therefore, the backoff time determined on the basis of ACK and NACK signals for the transmission #N may be inappropriate for the plurality of scheduled transmission destinations of the transmission #N+2.

For example, packet collisions may not occur around a plurality of scheduled transmission destinations in transmission of the transmission #N+2 although the CW has been enlarged on the basis of ACK and NACK signals for the transmission #N, and thus the utilization efficiency of time resources may be reduced in proportion to an increase in the backoff time. Also, packet collisions may be likely to occur around a plurality of scheduled transmission destinations in transmission of the transmission #N+2 although the CW has been reduced on the basis of ACK and NACK signals for the transmission #N, and thus packet collisions may become more likely to occur due to a decreased backoff time.

Therefore, in the third and fourth embodiments, a back-off time to be applied to LBT before transmission to a plurality of scheduled transmission destinations is determined taking into consideration the plurality of scheduled transmission destinations, thereby achieving determination of an appropriate backoff time for the plurality of scheduled transmission destinations.

Hereinafter, the third and fourth embodiments will be sequentially explained.

[Third Embodiment]

Figure 9:
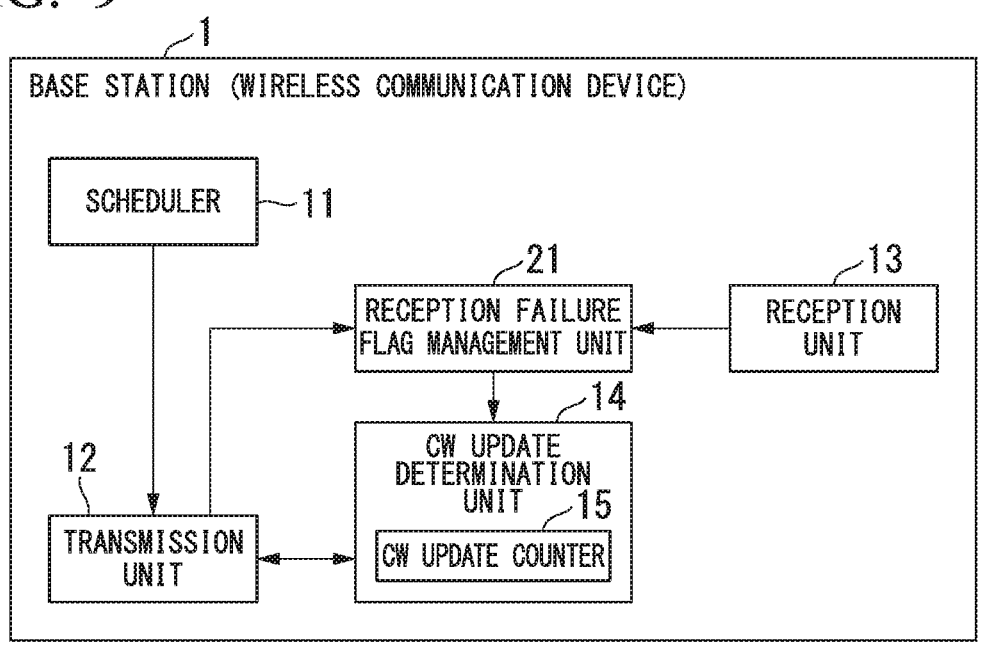
FIG. 9 is a schematic configuration diagram of a base station 1 according to a third embodiment.

FIG. 9 is a schematic configuration diagram of a base station 1 according to the third embodiment. In FIG. 9, the base station 1 includes a scheduler 11, a transmission unit 12, a reception unit 13, a CW update determination unit 14, and a reception failure flag management unit 21. The CW update determination unit 14 includes a CW update counter 15. The scheduler 11, the transmission unit 12, and the reception unit 13 are similar to those of the first embodiment described above.

The reception failure flag management unit 21 holds a reception failure flag for each terminal that has established a connection with the base station 1. The reception failure flag management unit 21 updates the reception failure flag for each destination on the basis of an ACK signal and a NACK signal from each destination for data transmitted by the transmission unit 12. The initial value of the reception failure flag is off.

In the CW update determination unit 14, the CW update counter 15 holds a CW update counter value. The CW update counter 15 updates the CW update counter value on the basis of the reception failure flag of the scheduled transmission destination. When there are a plurality of scheduled transmission destinations, the CW update counter 15 updates the CW update counter value on the basis of reception failure flags of the plurality of scheduled transmission destinations. In accordance with the CW update counter value, the CW update determination unit 14 determines a maximum CW value to be applied to LBT which is to be performed before transmission to the transmission destinations. The maximum CW value corresponds to a settable range of the backoff time. The settable range of the backoff time corresponds to at least part of a settable range of the common waiting time for the plurality of scheduled transmission destinations.

Figure 10:
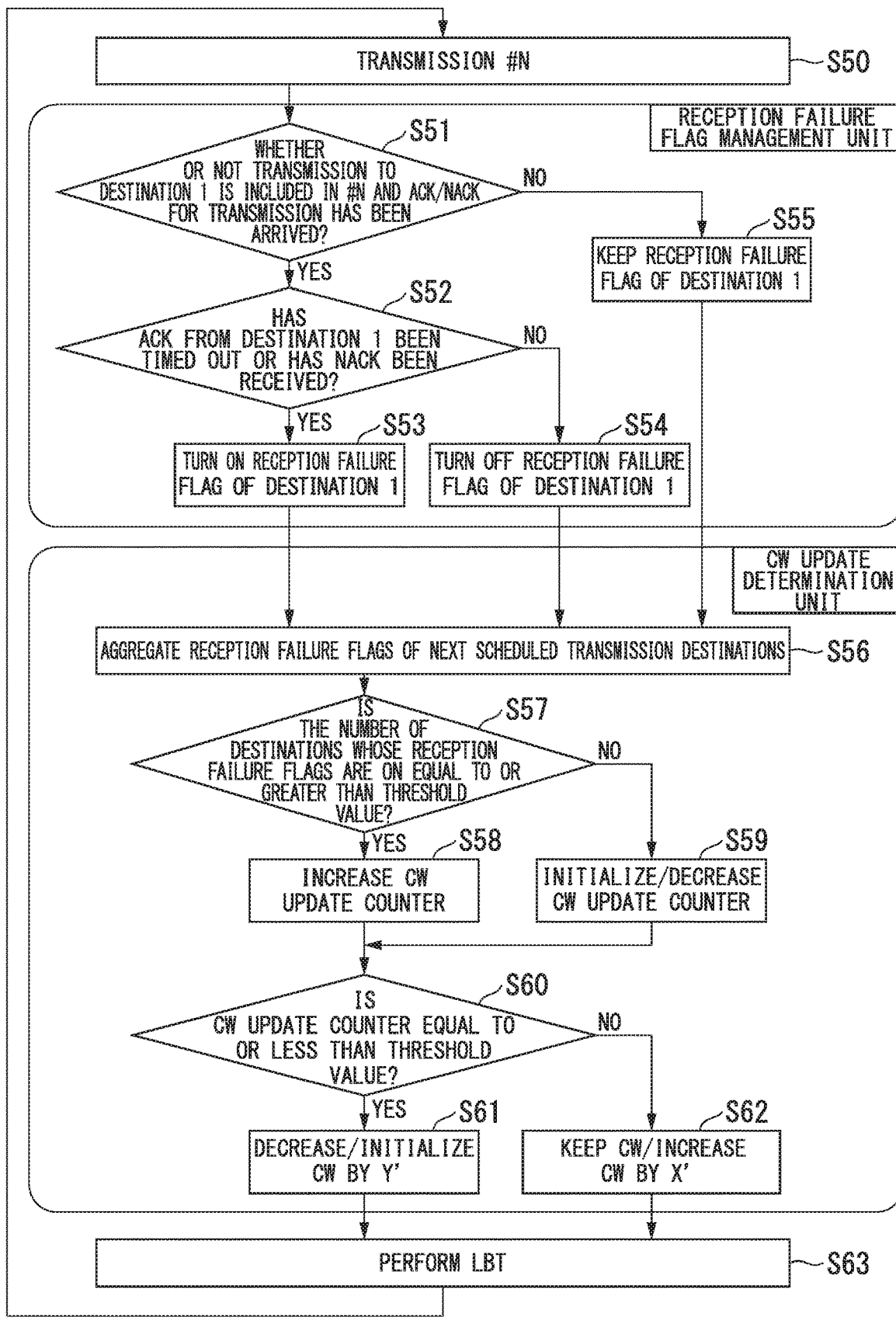
FIG. 10 is a flowchart of example 1 of a transmission method according to the third embodiment.
Figure 11:
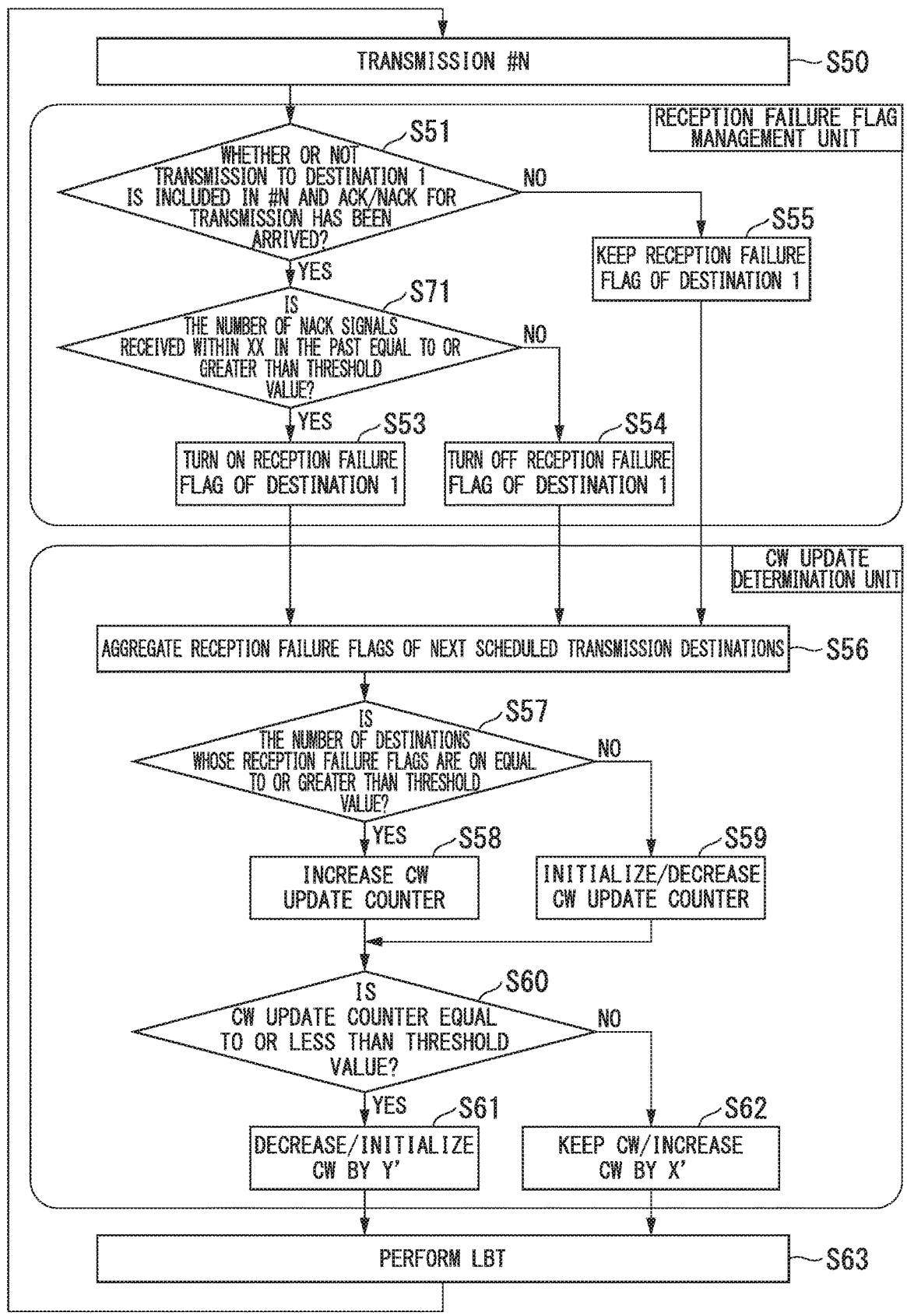
FIG. 11 is a flowchart of example 2 of the transmission method according to the third embodiment.

Next, a transmission operation of the base station 1 according to the third embodiment will be described with reference to FIGS. 10 and 11. FIG. 10 is a flowchart of example 1 of the transmission method according to the third embodiment. FIG. 11 is a flowchart of example 2 of the transmission method according to the third embodiment.

[Example 1 of Transmission Method According to Third Embodiment]

The example 1 of the transmission method according to the third embodiment will now be described with reference to FIG. 10. Acknowledgment information f_(N, m) is input from the reception unit 13 to the reception failure flag management unit 21. The acknowledgement information f_(N, m) is similar to that of each of the embodiments described above.

(Step S50) The transmission unit 12 performs transmission #N and the reception unit 13 inputs the acknowledgement information f_(N, m) to the reception failure flag management unit 21. The acknowledgement information f_(N, m) includes information on an ACK signal and a NACK signal for each destination.

Subsequently, processes of steps S51 to S55 are performed for each destination of the transmission #N. Here, one of the destinations of the transmission #N is referred to as destination 1 and the following description will be given with reference to the destination 1 as an example.

(Step S51) On the basis of the acknowledgement information f_(N, m), the reception failure flag management unit 21 determines whether or not an ACK signal or a NACK signal for the transmission #N has been received from the destination 1. If the result of the determination is that an ACK signal or a NACK signal for the transmission #N has been received from the destination 1, the reception failure flag management unit 21 proceeds to step S52 and otherwise proceeds to step S55.

(Step S52) The reception failure flag management unit 21 determines whether or not an ACK signal timeout of the destination 1 has occurred or whether or not a NACK signal has been received from the destination 1. If the result of the determination is that an ACK signal timeout of the destination 1 has occurred or a NACK signal has been received from the destination 1, the reception failure flag management unit 21 proceeds to step S53 and otherwise proceeds to step S54.

(Step S53) The reception failure flag management unit 21 turns on the reception failure flag of the destination 1.

(Step S54) The reception failure flag management unit 21 turns off the reception failure flag of the destination 1.

(Step S55) The reception failure flag management unit 21 keeps the reception failure flag of the destination 1 unchanged.

After the processes of steps S51 to S55 are performed for all destinations of the transmission #N, the CW update determination unit 14 proceeds to step S56.

(Step S56) The CW update determination unit 14 acquires the (ON or OFF) value of the reception failure flag of the scheduled transmission destination from the reception failure flag management unit 21. When there are a plurality of scheduled transmission destinations, the CW update determination unit 14 acquires the (ON or OFF) values of the reception failure flags of the plurality of scheduled transmission destinations. A notification of the scheduled transmission destinations is provided from the transmission unit 12 to the CW update determination unit 14. The transmission unit 12 notifies the CW update determination unit 14 of a next scheduled transmission destination. The CW update determination unit 14 aggregates ON values among the (ON or OFF) values of reception failure flags of next scheduled transmission destinations, of which the transmission unit 12 has notified.

(Step S57) The CW update determination unit 14 determines whether or not the aggregate number of ON values is equal to or greater than a threshold value. If the result of the determination is that the aggregate number of ON values is equal to or greater than the threshold value, the CW update determination unit 14 proceeds to step S58 and otherwise proceeds to step S59.

(Step S58) The CW update counter 15 increases the CW update counter value.

(Step S59) The CW update counter 15 initializes or decreases the CW update counter value.

(Step S60) The CW update determination unit 14 determines whether or not the CW update counter value is equal to or less than a threshold value. If the result of the determination is that the CW update counter value is equal to or less than the threshold value, the CW update determination unit 14 proceeds to step S61 and otherwise proceeds to step S62.

(Step S61) The CW update determination unit 14 initializes the maximum CW value or decreases the maximum CW value by Y', such that the resulting value is less than the current value by Y'. The value of Y' may be arbitrarily set.

(Step S62) The CW update determination unit 14 keeps the maximum CW value unchanged or increases the maximum CW value by X', such that the resulting value is greater than the current value by X'. The value of X' may be arbitrarily set.

(Step S63) The CW update determination unit 14 outputs the resulting maximum CW value of step S61 or step S62 to the transmission unit 12. On the basis of the maximum CW value, the transmission unit 12 determines a backoff time to be applied to LBT before transmission to the next scheduled transmission destination.

[Example 2 of Transmission Method According to Third Embodiment]

The example 2 of the transmission method according to the third embodiment will now be described with reference to FIG. 11. In FIG. 11, portions corresponding to steps of FIG. 10 are denoted by the same reference signs as those of FIG. 10 and descriptions thereof are omitted. The example 2 of the transmission method according to the third embodiment shown in FIG. 11 differs from the example 1 of the transmission method according to the third embodiment shown in FIG. 10 only in terms of a portion corresponding to step S52 of the example 1 and the other steps are similar. In the example 2 of the transmission method according to the third embodiment, the reception failure flag management unit 21 further includes an acknowledgement information history recording unit that records a history of acknowledgement information.

(Step S50) The transmission unit 12 performs transmission #N and the reception unit 13 inputs acknowledgement information $f\_(N, m)$ to the reception failure flag management unit 21. The acknowledgement information $f\_(N, m)$ includes information on an ACK signal and a NACK signal for each destination.

Subsequently, processes of steps S51, S71, and S53 to S55 are performed for each destination of the transmission #N. Here, one of the destinations of the transmission #N is referred to as destination 1 and the following description will be given with reference to the destination 1 as an example.

(Step S51) On the basis of the acknowledgement information $f\_(N, m)$, the reception failure flag management unit 21 determines whether or not an ACK signal or a NACK signal for the transmission #N has been received from the destination 1. If the result of the determination is that an ACK signal or a NACK signal for the transmission #N has been received from the destination 1, the reception failure flag management unit 21 proceeds to step S71 and otherwise proceeds to step S55.

(Step S71) On the basis of the history of acknowledgement information, the reception failure flag management unit 21 determines whether or not the total number of received NACK signals within a predetermined condition P in the past for the destination 1 is equal to or greater than a threshold value. If the result of the determination is that the total number of received NACK signals is equal to or greater than the threshold value, the reception failure flag management unit 21 proceeds to step S53 and otherwise proceeds to step S54. For example, the reception failure flag management unit 21 may use a predetermined unit time (P ms) or a predetermined number of times (P times) of transmission by the transmission unit 12 as the predetermined condition P.

Steps S53 to S55 are similar to those of the example 1 of the transmission method according to the third embodiment described above with reference to FIG. 10. After the processes of steps S51 to S55 are performed for all destinations of the transmission #N, the CW update determination unit 14 proceeds to step S56. Steps S56 to S63 are similar to those of the example 1 of the transmission method according to the third embodiment described above with reference to FIG. 10.

According to the example 2 of the transmission method according to the third embodiment, by using the record of the past, it is particularly possible to enlarge the CW only when performing transmission to a destination where packet collisions are likely to occur and thus to achieve an improvement in the utilization efficiency of time resources.

According to the third embodiment, taking into consideration a plurality of scheduled transmission destinations, it is possible to determine a back-off time to be applied to LBT before transmission to the plurality of scheduled transmission destinations. Thereby, it is possible to obtain an advantageous effect that it is possible to determine an appropriate backoff time for a plurality of scheduled transmission destinations.

The above is the description of the third embodiment.

[Fourth Embodiment]

Figure 12:
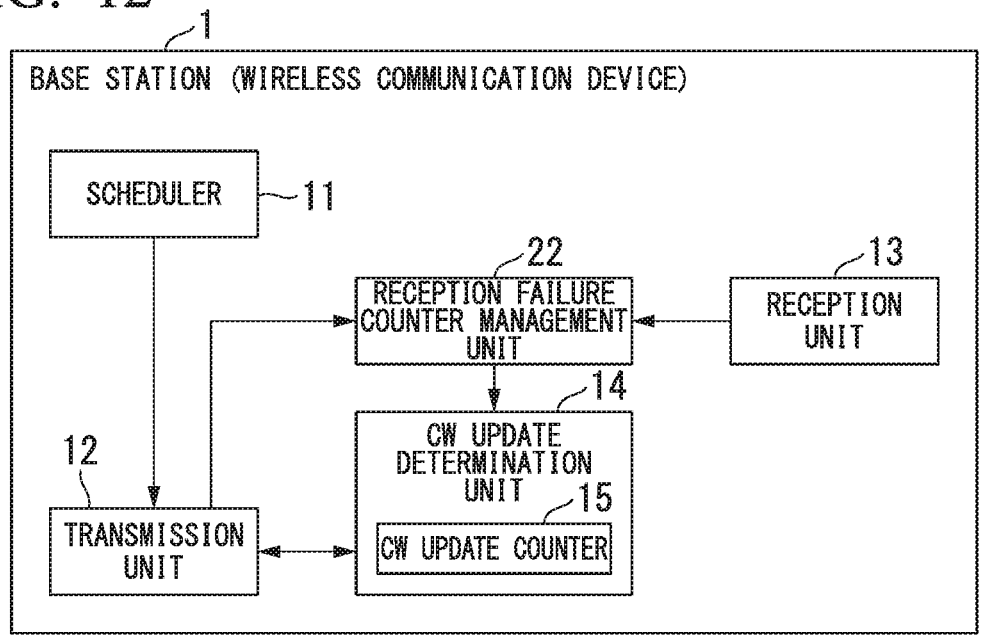
FIG. 12 is a schematic configuration diagram of a base station 1 according to a fourth embodiment.

FIG. 12 is a schematic configuration diagram of a base station 1 according to the fourth embodiment. In FIG. 12, the base station 1 includes a scheduler 11, a transmission unit 12, a reception unit 13, a CW update determination unit 14, and a reception failure counter management unit 22. The CW update determination unit 14 includes a CW update counter 15. The scheduler 11, the transmission unit 12, and the reception unit 13 are similar to those of the first embodiment described above.

The reception failure counter management unit 22 holds a reception failure counter value for each terminal that has established a connection with the base station 1. The initial value of the reception failure counter value is 0. A terminal that has established a connection with the base station 1 is a destination to which the transmission unit 12 transmits data. The reception failure counter management unit 22 updates the reception failure counter value for each destination on the basis of an ACK signal and a NACK signal from each destination for data transmitted by the transmission unit 12.

In the CW update determination unit 14, the CW update counter 15 holds the CW update counter value. The CW update counter 15 updates the CW update counter value on the basis of the reception failure counter value of the scheduled transmission destination. When there are a plurality of scheduled transmission destinations, the CW update counter 15 updates the CW update counter value on the basis of the reception failure counter values of the plurality of scheduled transmission destinations. In accordance with the CW update counter value, the CW update determination unit 14 determines a maximum CW value to be applied to LBT before transmission to the scheduled transmission destinations. The maximum CW value corresponds to a settable range of the backoff time. The settable range of the backoff time corresponds to at least part of a settable range of the common waiting time for the plurality of scheduled transmission destinations.

Figure 13:
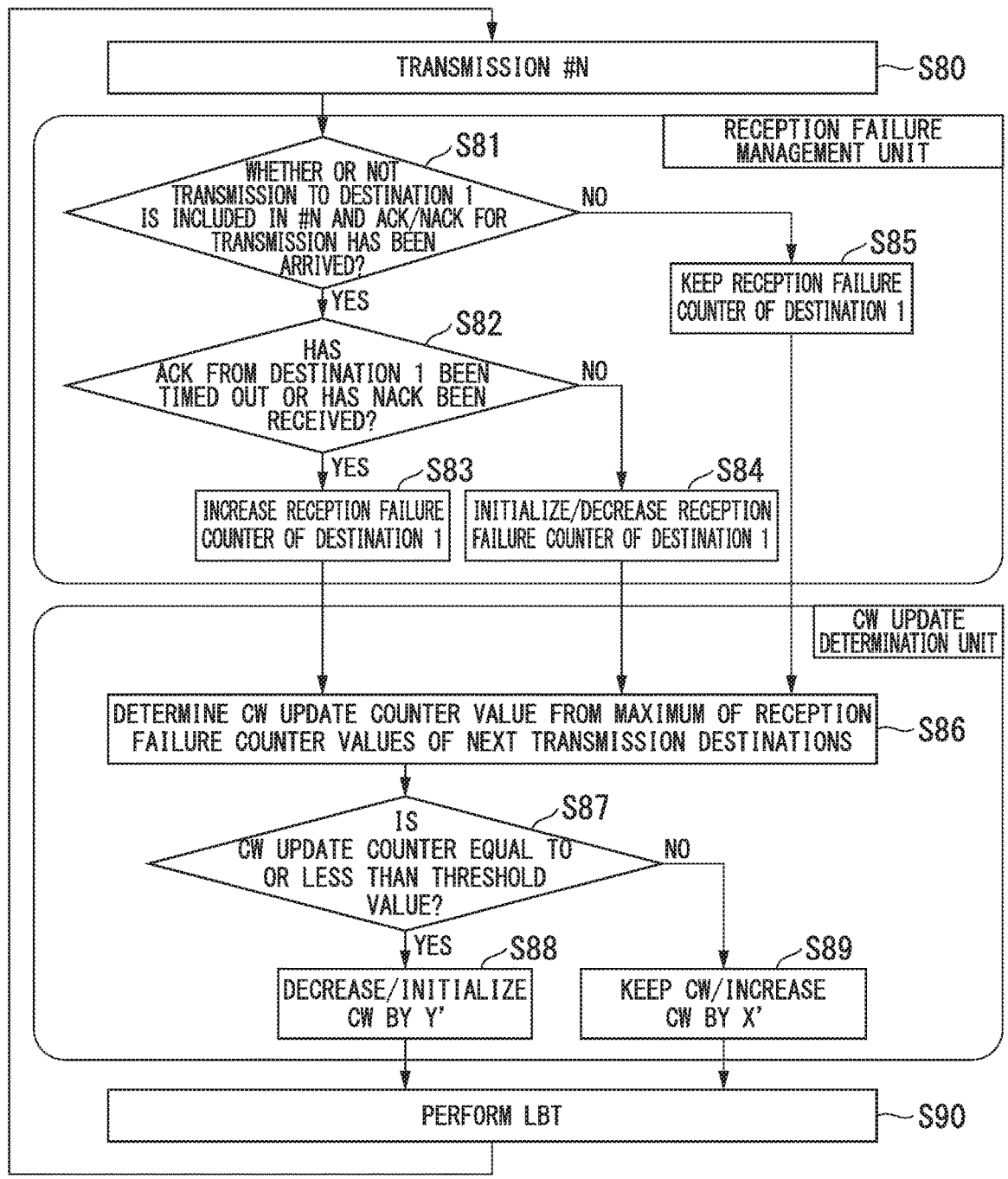
FIG. 13 is a flowchart of example 1 of a transmission method according to the fourth embodiment.
Figure 14:
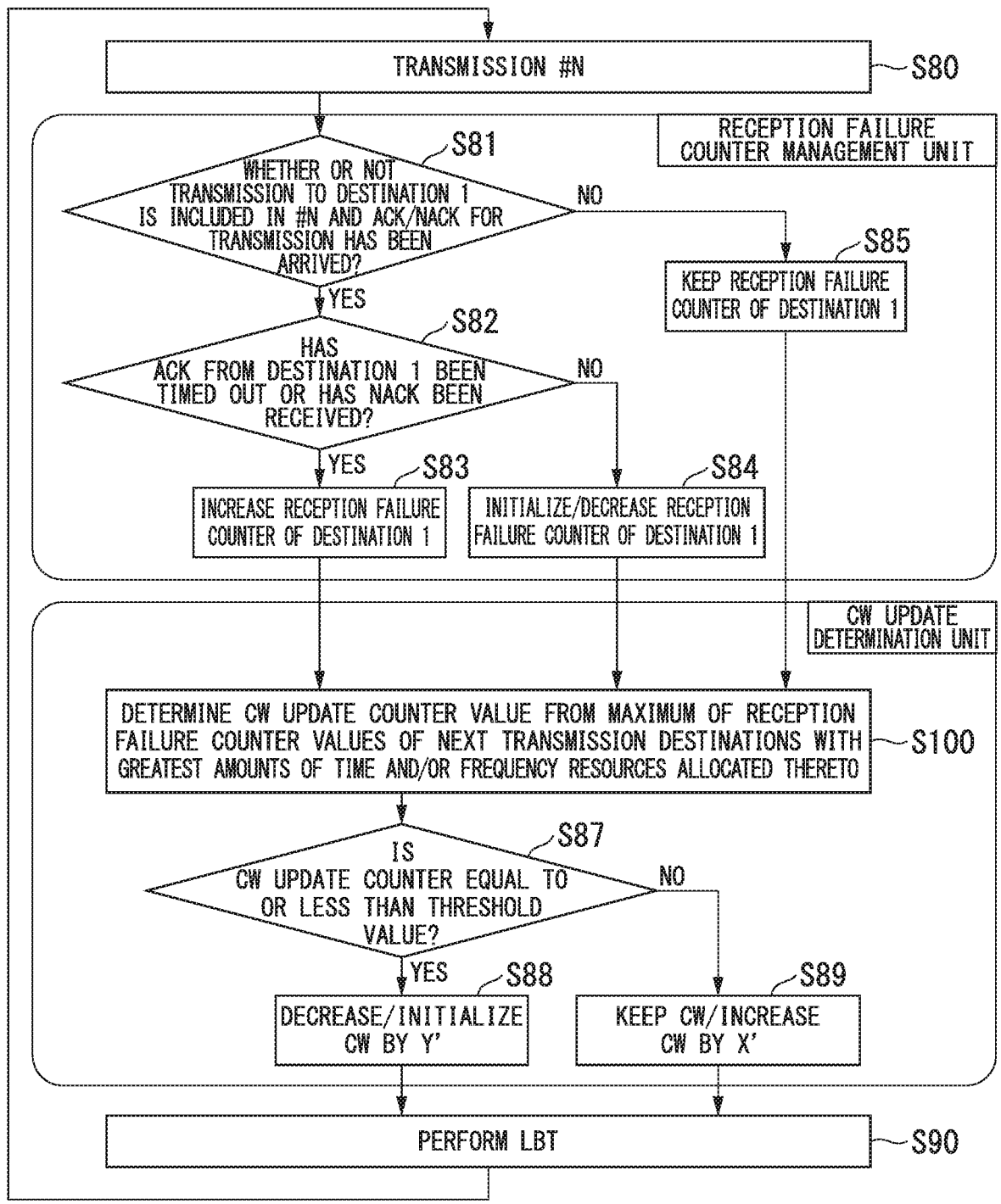
FIG. 14 is a flowchart of example 2 of the transmission method according to the fourth embodiment.

Next, a transmission operation of the base station 1 according to the fourth embodiment will be described with reference to FIGS. 13 and 14. FIG. 13 is a flowchart of example 1 of the transmission method according to the fourth embodiment. FIG. 14 is a flowchart of example 2 of the transmission method according to the fourth embodiment.

[Example 1 of Transmission Method According to Fourth Embodiment]

An example 1 of the transmission method according to the fourth embodiment will be described with reference to FIG. 13. Acknowledgment information f_(N, m) is input from the reception unit 13 to the reception failure counter management unit 22. The acknowledgement information f_(N, m) is similar to that of each of the embodiments described above.

(Step S80) The transmission unit 12 performs transmission #N and the reception unit 13 inputs acknowledgement information f_(N, m) to the CW update determination unit 14. The acknowledgement information f_(N, m) includes information on an ACK signal and a NACK signal for each destination.

Subsequently, processes of steps S81 to S85 are performed for each destination of the transmission #N. Here, one of the destinations of the transmission #N is referred to as destination 1 and the following description will be given with reference to the destination 1 as an example.

(Step S81) On the basis of the acknowledgement information f_(N, m), the reception failure counter management unit 22 determines whether or not an ACK signal or NACK signal for the transmission #N has been received from the destination 1. If the result of the determination is that an ACK signal or a NACK signal for the transmission #N has been received from the destination 1, the reception failure counter management unit 22 proceeds to step S82 and otherwise proceeds to step S85.

(Step S82) The reception failure counter management unit 22 determines whether or not an ACK signal timeout of the destination 1 has occurred or whether or not a NACK signal has been received from the destination 1. If the result of the determination is that an ACK signal timeout of the destination 1 has occurred or a NACK signal has been received from the destination 1, the reception failure counter management unit 22 proceeds to step S83 and otherwise proceeds to step S84.

(Step S83) The reception failure counter management unit 22 increases the reception failure counter value of the destination 1.

(Step S84) The reception failure counter management unit 22 initializes or decreases the reception failure counter value of the destination 1.

(Step S85) The reception failure counter management unit 22 keeps the reception failure counter value of the destination 1 unchanged.

After the processes of the above steps S81 to S85 are performed for all destinations of the transmission #N, the CW update determination unit 14 proceeds to step S86.

(Step S86) The CW update determination unit 14 acquires the reception failure counter value of the scheduled transmission destination from the reception failure counter management unit 22. When there are a plurality of scheduled transmission destinations, the CW update determination unit 14 acquires reception failure counter values of the plurality of scheduled transmission destinations. A notification of the scheduled transmission destinations is provided from the transmission unit 12 to the CW update determination unit 14. The transmission unit 12 notifies the CW update determination unit 14 of a next scheduled transmission destination. The CW update determination unit 14 selects a maximum value from the reception failure counter values of next scheduled transmission destinations, of which the transmission unit 12 has notified. The CW update counter 15 sets the selected maximum reception failure counter value as the CW update counter value.

As another example of the above step S2, the CW update determination unit 14 may calculate an average of the reception failure counter values of the next scheduled transmission destinations, of which the transmission unit 12 has notified, and set the average as the CW update counter value.

(Step S87) The CW update determination unit 14 determines whether or not the CW update counter value is equal to or less than a threshold value. If the result of the determination is that the CW update counter value is equal to or less than the threshold value, the CW update determination unit 14 proceeds to step S88 and otherwise proceeds to step S89.

(Step S88) The CW update determination unit 14 initializes the maximum CW value or decreases the maximum CW value by Y', such that the resulting value is less than the current value by Y'. The value of Y' may be arbitrarily set.

(Step S89) The CW update determination unit 14 keeps the maximum CW value unchanged or increases the maximum CW value by X', such that the resulting value is greater than the current value by X'. The value of X' may be arbitrarily set.

(Step S90) The CW update determination unit 14 outputs the resulting maximum CW value of step S88 or step S89 to the transmission unit 12. On the basis of the maximum CW value, the transmission unit 12 determines a backoff time to be applied to LBT before transmission to the next scheduled transmission destinations.

According to the example 1 of the transmission method according to the fourth embodiment, when a destination with many reception failures is included in scheduled transmission destinations, it is possible to enlarge the CW and reduce the influence of interference.

[Example 2 of Transmission Method According to Fourth Embodiment]

The example 2 of the transmission method according to the fourth embodiment will now be described with reference to FIG. 14. In FIG. 14, portions corresponding to steps of FIG. 13 are denoted by the same reference signs as those of FIG. 13 and descriptions thereof are omitted. The example 2 of the transmission method according to the fourth embodiment shown in FIG. 14 differs from the example 1 of the transmission method according to the fourth embodiment shown in FIG. 13 only in terms of a portion (step S100 in FIG. 14) corresponding to step S86 of the example 1 and the other steps are similar.

In FIG. 14, after processes of steps S81 to S85 are performed for all destinations of the transmission #N subsequent to step S80, the CW update determination unit 14 proceeds to step S100. Steps S80 to S85 are similar to those of the example 1 of the transmission method according to the fourth embodiment described above with reference to FIG. 13.

(Step S100) The CW update determination unit 14 selects a destination, to which the greatest amount of wireless resources have been allocated as a determination reference, from scheduled transmission destinations. The transmission unit 12 notifies the CW update determination unit 14 of the scheduled transmission destinations and the amounts of allocated wireless resources allocated thereto as determination references. The wireless resources as a determination reference may be time resources or frequency resources or may be both time and frequency resources. When the wireless resources as a determination reference are both time and frequency resources, the CW update determination unit 14 may select a destination with the greatest amount of either time resources or frequency resources allocated thereto or may select a destination with the greatest amount of both time resources and frequency resources allocated thereto. When there is no destination with the greatest amount of both time and frequency resources allocated thereto, the CW update determination unit 14 may determine the amount of allocated time and frequency resources in a comprehensive manner and select a destination to which the greatest comprehensive amount of resources have been allocated.

The CW update determination unit 14 acquires from the reception failure counter management unit 22 a reception failure counter value of the destination which is selected as a destination, to which the greatest amount of wireless resources have been allocated as a determination reference, from the scheduled transmission destinations. When there are a plurality of selected destinations, the CW update determination unit 14 acquires reception failure counter values of the plurality of selected destinations.

The CW update determination unit 14 selects a maximum value from the reception failure counter values acquired from the reception failure counter management unit 22. The CW update counter 15 sets the selected maximum reception failure counter value as the CW update counter value.

Subsequently, steps S87 to S90 are performed. Steps S87 to S90 are similar to those of the example 1 of the transmission method according to the fourth embodiment described above with reference to FIG. 13.

According to the example 2 of the transmission method according to the fourth embodiment, it is possible to contribute to controlling the probability of packet collision in communication of a destination, which most greatly consumes wireless resources as a determination reference, to an appropriate value.

Although the embodiments of the present invention have been described above in detail with reference to the drawings, specific configurations are not limited to the embodiments and include design changes or the like within a scope not departing from the gist of the present invention.

For example, in each of the embodiments described above, when neither an ACK signal nor a NACK signal is included in the acknowledgement information f_(N, m), the CW update determination unit 14 may use a CW update counter value, which is based on acknowledgement information of transmission #N−1 immediately previous to the transmission #N, for the transmission #N+1.

Figure 15:
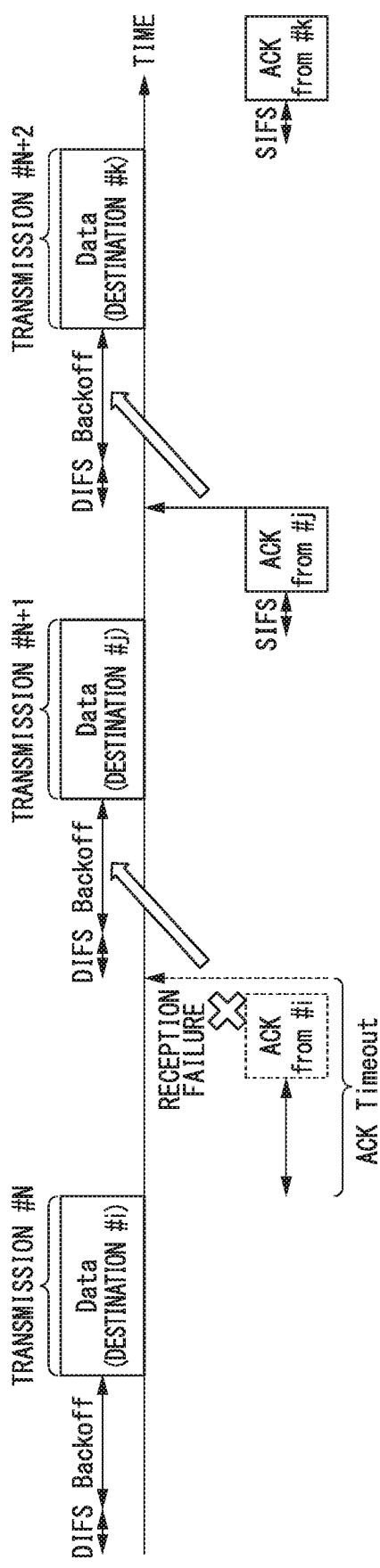
FIG. 15 is an explanatory diagram of a related-art Wi-Fi LBT technology.

Further, in each of the above embodiments, the method of updating the maximum CW value may be similar to that of the Wi-Fi LBT technology shown in FIG. 15. In this case, the CW update determination unit 14 may use the CW update counter value according to the present embodiment instead of the number of retransmissions n used in the Wi-Fi LBT technology. For example, instead of steps S7 to S9 shown in FIGS. 3, 4, 6 and 7, the CW update determination unit 14 may calculate the maximum CW value, similar to the Wi-Fi LBT technology. To calculate this maximum CW value, a CW update counter value determined in steps prior to step S7 shown in FIGS. 3, 4, 6 and 7 is used as the number of retransmissions n. Further, instead of steps S60 to S62 shown in FIGS. 10 and 11, the CW update determination unit 14 may calculate the maximum CW value, similar to the Wi-Fi LBT technology. To calculate this maximum CW value, a CW update counter value determined in steps prior to step S60 shown in FIGS. 10 and 11 is used as the number of retransmissions n. Further, instead of steps S87 to S89 shown in FIGS. 13 and 14, the CW update determination unit 14 may calculate the maximum CW value, similar to the Wi-Fi LBT technology. To calculate this maximum CW value, a CW update counter value determined in steps prior to step S87 shown in FIGS. 13 and 14 is used as the number of retransmissions n.

In addition, the CW update determination unit 14 may use a plurality of threshold values as a method of updating the CW update counter value in each of the above-described embodiments. For example, in each of step S2 in FIG. 3, step S21 in FIG. 4, and step S57 in FIGS. 10 and 11, the CW update determination unit 14 may increase the CW update counter if a corresponding index (which is a value to be compared with a threshold value) is equal to or greater than threshold value A, initialize or decrease the CW update counter if the index is equal to or less than threshold value B, and keep the CW update counter if neither.

Although the above embodiments are applied to the LAA wireless communication system, the present invention may be applied to other wireless communication systems such as a wireless LAN. For example, the present invention may be applied to wireless LAN access point devices.

Although the above embodiments are applied to the base station, the present invention may be applied to other wireless communication devices such as terminals that perform terminal-to-terminal communication.

A computer program for realizing the functions of the base station 1 (wireless communication device) described above may be recorded on a computer readable recording medium, such that a computer system reads and executes the program recorded on the recording medium. The "computer system" referred to here may be that which includes an OS or hardware such as peripheral devices.

Further, "computer readable recording medium" refers to a storage device such as a flexible disk, a magneto-optical disk, a ROM, a nonvolatile writable memory such as a flash memory, a portable medium such as a digital versatile disk (DVD), or a hard disk provided in a computer system.

INDUSTRIAL APPLICABILITY

The present invention can also be applied to applications where it is necessary to appropriately determine a waiting time when transmission to a plurality of destinations is performed.

REFERENCE SIGNS LIST

1 Base station (wireless communication device)
11 Scheduler
12 Transmission unit
13 Reception unit
14 CW update determination unit
15 CW update counter
16 Reception failure counter
21 Reception failure flag management unit
22 Reception failure counter management unit

The invention claimed is:

1. A wireless communication device comprising:
a transmitter configured to transmit a signal to a plurality of destinations after waiting for a common waiting time set for transmission to the plurality of destinations;
a reception failure counter configured to update respective reception failure counter values for the plurality of destinations on a basis of acknowledgement information from each of the plurality of destinations for the signal transmitted by the transmitter;
a reception failure counter value history recording processor configured to record a history of the reception failure counter values;
a counter configured to update a counter value on a basis of the history of the reception failure counter values; and
an update determination processor configured to determine a settable range of the common waiting time which is to be set for transmission to a plurality of scheduled transmission destinations according to the counter value,
wherein the transmitter is configured to determine the common waiting time for transmission to the plurality of scheduled transmission destinations on a basis of the settable range determined by the update determination processor.

2. The wireless communication device according to claim 1, further comprising:
an acknowledgement information history recording processor configured to record a history of the acknowledgement information,
wherein the counter is configured to update the counter value on a basis of the history of the acknowledgement information.

3. A wireless communication device comprising:
a transmitter configured to transmit a signal to a plurality of destinations after waiting for a common waiting time set for transmission to the plurality of destinations;
an acknowledgement information history recording processor configured to record a history of acknowledgement information from each of the plurality of destinations for the signal transmitted by the transmitter;
a reception failure flag management processor configured to update respective reception failure flags for the plurality of destinations on a basis of the history of the acknowledgement information;
a counter configured to update a counter value on a basis of the reception failure flags of a plurality of scheduled transmission destinations; and
an update determination processor configured to determine a settable range of the common waiting time which is to be set for transmission to the plurality of scheduled transmission destinations according to the counter value,
wherein the transmitter is configured to determine the common waiting time for transmission to the plurality of scheduled transmission destinations on a basis of the settable range determined by the update determination processor.

4. A transmission method performed by a wireless communication device, the transmission method comprising:
transmitting a signal to a plurality of destinations after waiting for a common waiting time set for transmission to the plurality of destinations;
updating respective reception failure counter values for the plurality of destinations on a basis of acknowledgement information from each of the plurality of destinations for the signal transmitted in the transmitting;
recording a history of the reception failure counter values;
updating a counter value on a basis of the history of the reception failure counter values;
determining a settable range of the common waiting time which is to be set for transmission to a plurality of scheduled transmission destinations according to the counter value; and
determining the common waiting time for transmission to the plurality of scheduled transmission destinations on a basis of the settable range determined in the settable range determining.

5. A transmission method performed by a wireless communication device, the transmission method comprising:
transmitting a signal to a plurality of destinations after waiting for a common waiting time set for transmission to the plurality of destinations;
recording a history of acknowledgement information from each of the plurality of destinations for the signal transmitted in the transmitting;

updating respective reception failure flags for the plurality of destinations on a basis of the history of the acknowledgement information;

updating a counter value on a basis of the reception failure flags of a plurality of scheduled transmission destinations;

determining a settable range of the common waiting time which is to be set for transmission to the plurality of scheduled transmission destinations according to the counter value; and determining the common waiting time for transmission to the plurality of scheduled transmission destinations on a basis of the settable range determined in the settable range determining.

* * * * *